(12) United States Patent
Dunagan et al.

(10) Patent No.: US 7,376,121 B2
(45) Date of Patent: May 20, 2008

(54) METHOD AND SYSTEM FOR GLOBAL ROUTING AND BANDWIDTH SHARING

(75) Inventors: John David Dunagan, Sammamish, WA (US); Jiahe Wang, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 937 days.

(21) Appl. No.: 10/455,877

(22) Filed: Jun. 6, 2003

(65) Prior Publication Data

US 2004/0246905 A1    Dec. 9, 2004

(51) Int. Cl.
*H04L 12/28* (2006.01)
(52) U.S. Cl. .................................. 370/351
(58) Field of Classification Search ............... 370/229, 370/231–235, 351, 357, 386, 388, 389, 392, 370/400, 422, 402, 229 H
See application file for complete search history.

(56) References Cited

U.S. PATENT DOCUMENTS

| | | | | |
|---|---|---|---|---|
| 5,289,462 | A | * | 2/1994 | Ahmadi et al. ............. 370/232 |
| 5,347,511 | A | * | 9/1994 | Gun ........................... 370/255 |
| 5,359,593 | A | * | 10/1994 | Derby et al. ................ 370/234 |
| 5,434,848 | A | * | 7/1995 | Chimento et al. .......... 370/232 |
| 5,629,928 | A | | 5/1997 | Calvignac et al. |
| 5,790,522 | A | | 8/1998 | Fichou et al. |
| 5,815,492 | A | * | 9/1998 | Berthaud et al. ........... 370/234 |
| 5,884,037 | A | * | 3/1999 | Aras et al. .................. 709/226 |
| 5,936,940 | A | * | 8/1999 | Marin et al. ................ 370/232 |
| 5,940,372 | A | * | 8/1999 | Bertin et al. ................ 370/238 |
| 6,011,776 | A | * | 1/2000 | Berthaud et al. ........... 370/232 |
| 6,011,804 | A | * | 1/2000 | Bertin et al. ................ 370/468 |
| 6,262,974 | B1 | * | 7/2001 | Chevalier et al. ........... 370/232 |
| 6,359,862 | B1 | | 3/2002 | Jeffries et al. |
| 6,359,863 | B1 | * | 3/2002 | Varma et al. ............... 370/232 |
| 6,377,544 | B1 | * | 4/2002 | Muthukrishnan et al. ... 370/229 |
| 6,404,735 | B1 | * | 6/2002 | Beshai et al. ............... 370/230 |

OTHER PUBLICATIONS

Adamic, L. A.: "*Zipf, Power-laws, and Pareto—a Ranking Tutorial*", pp. 1-6, retrieved from http://ginger.hpl.hp.com/shl/papers/ranking/ranking.html, May 27, 2003.

(Continued)

*Primary Examiner*—Dmitry Levitan
(74) *Attorney, Agent, or Firm*—Wolf, Greenfield & Sacks, P.C.

(57) ABSTRACT

Disclosed is a routing and bandwidth allocation system that maximizes network throughput while maintaining global fairness in the sharing of network resources. From gathered global network information (such as inter-node communications patterns and network topology), routing tables and bandwidth allocation policies are computed for routers. In some embodiments, the computations involve applying multi-commodity flow methods to provide a "max-fair" allocation of network resources. While in some embodiments each router collects global network information and then locally produces its own routing and bandwidth allocation tables, it can be simpler and cheaper in terms of both computation and security for a centralized, trusted control unit to perform the calculations and then to distribute the results to the routers. The computed bandwidth policies can leave some bandwidth unallocated to handle unexpected surges in demand. The computed routing tables can include multiple paths leading to greater link utilization and to robustness to link failure.

39 Claims, 29 Drawing Sheets

OTHER PUBLICATIONS

Aggarwal et al.: "*Node-Disjoint Paths on the Mesh and a New Trade-Off in VLSI Layout*", SIAM J. Comput., vol. 29, No. 4, pp. 1321-1333.

Jain et al.: "*A Model and Methodology for Computing Performance Bounds in Multi-hop Wireless Networks*", pp. 1-21.

Banchs, A.: "*User Fair Queing: Fair Allocation of Bandwidth for Users*", IEEE Infocom (2002).

Bertsekas et al.: "*Data Networks*", pp. 524-529, Prentice Hall (1992).

Blanton et al.: "*On Making TCP More Robust to Packet Reordering*" (2002).

Cao et al.: "*Rainbow Fair Queueing: Fair Bandwidth Sharing Without Per-Flow State*", IEEE Infocom (2000).

Chen et al.: "*An Efficient Multipath Forwarding Method*", in Proceedings of IEEE Infocom (1998).

Dovrolis et al.: "*A Case for Relative Differentiated Services and the Proportional Differentiation Model*" (1999).

Floyd et al.: "*Promoting the Use of End-to-End Congestion Control in the Internet*", IEEE/ACM Transactions on Networking, vol. 7, No. 4 (1999), pp. 458-472.

Garg et al.: "*Faster and Simpler Algorithms for Multicommodity Flow and Other Fractional Packing Problems*", in IEEE Symposium on Foundations of Computer Science (1998), pp. 300-309.

Goel et al.: "*Combining Fairness with Throughput: Online Routing with Multiple Objectives*", in Proceedings of the Thirty-Second Annual ACM Symposium on Theory of Computing (2000).

Goldberg et al.: "*An Implementation of a Combinatorial Approximation Algorithm for Minimum-Cost Multicommodity Flow*", Lecture notes in Computer Science 1412 (1998), starting on p. 338.

Grotschel et al.: "*The Ellipsoid Method and Its Consequences in Combinatorial Optimization*", Combinatorica, vol. 1, No. 2 (1981), pp. 169-197.

Hahne: "*Round-Robin Scheduling for Max-Min Fairness in Data Networks*", IEEE Journal of Selected Areas in Communications, vol. 9, No. 7 (1991), pp. 1024-1039.

Kamath et al.: "*Simple and Fast Distributed Multicommodity Flow Algorithm*".

Kelly et al.: "*Rate Control for Communication Networks: Shadow Prices, Proportional Fairness and Stability*", Journal of Operational Research Society, vol. 49 (1998), pp. 237-252.

Klein et al.: "*Faster Approximation Algorithms for the Unit Capacity Concurrent Flow Problem with Applications to Routing and Finding Sparse Cuts*", SIAM Journal on Computing, vol. 23, No. 3 (1994), pp. 466-487.

Kleinberg et al.: "*Approximations for the Disjoint Paths Problem in High-Diameter Planar Networks*", pp. 26-35.

Kleinberg et al.: "*Fairness in Routing and Load Balancing*", in IEEE Symposium on Foundations of Computer Science (1999), pp. 568-578.

Kleinberg et al.: "*Disjoint Paths in Densely Embedded Graphs*", in IEEE Symposium on Foundations of Computer Science (1995), pp. 52-61.

Kumar et al.: "*Fairness Measures for Resource Allocation*", in IEEE Symposium on Foundations of Computer Science (2000), pp. 75-85.

Leighton et al.: "*New Algorithmic Aspects of the Local Lemma with Applications to Routing and Partitioning*", in SODA: ACM-SIAM Symposium on Discrete Algorithms (A Conference on Theoretical and Experimental Analysis of Discrete Algorithms) (1999).

Low et al.: "*Optimization Flow Control, I: Basic Algorithm and Convergence*", IEEE/ACM Transactions on Networking, vol. 6 (1999), pp. 861-875.

Marbach: "*Priority Service and Max-Min Fairness*", in The Proceedings of IEEE Infocom (2002).

Raghavan et al.: "*Randomized Rounding: a Technique for Provably Good Algorithms and Algorithmic Proofs*", Combinatorica, vol. 7, No. 4 (1987).

Shenker: "*Making Greed Work in Networks: A Game-Theoretic Analysis of Switch Service Disciplines*", in SIGCOMM Symposium on Communications Architectures and Protocols (Aug. 1994), pp. 47-57.

Schmoys: "*Approximation Algorithms for NPHard Problems*", chap. 5, PWS Publishing Company (1997).

Stoica et al.: "*Core-Stateless Fair Queueing: Achieving Approximately Fair Bandwidth Allocations in High Speed Networks*", in ACM SIGCOMM (1998).

Suzuki et al.: "*Fast Bandwidth Reservation Scheme with Multi-Link & Multi-Path Routing in ATM Networks*", in Proceedings of IEEE Infocom (1992).

Young: "*Sequential and Parallel Algorithms for Mixed Packing and Covering*", in IEEE Symposium on Foundations of Computer Science (2001).

\* cited by examiner

FIG. 5

Current Host Network Node: 102
Self-Designated Priority: 2

| Peer Host Network Node | Anticipated Bandwidth |
|---|---|
| 104 | 250 Kbps |
| 106 | 250 Kbps |
| 108 | 250 Kbps |

Current Router Network Node: 110

| Link Identifier | Remotely Connected Router | Link Bandwidth | Link State |
|---|---|---|---|
| 1 | 112 | 35 Mbps | Operational |
| 2 | 114 | 3.0 Mbps | Operational |
| 3 | 116 | 1.5 Mbps | Out of Service |

700

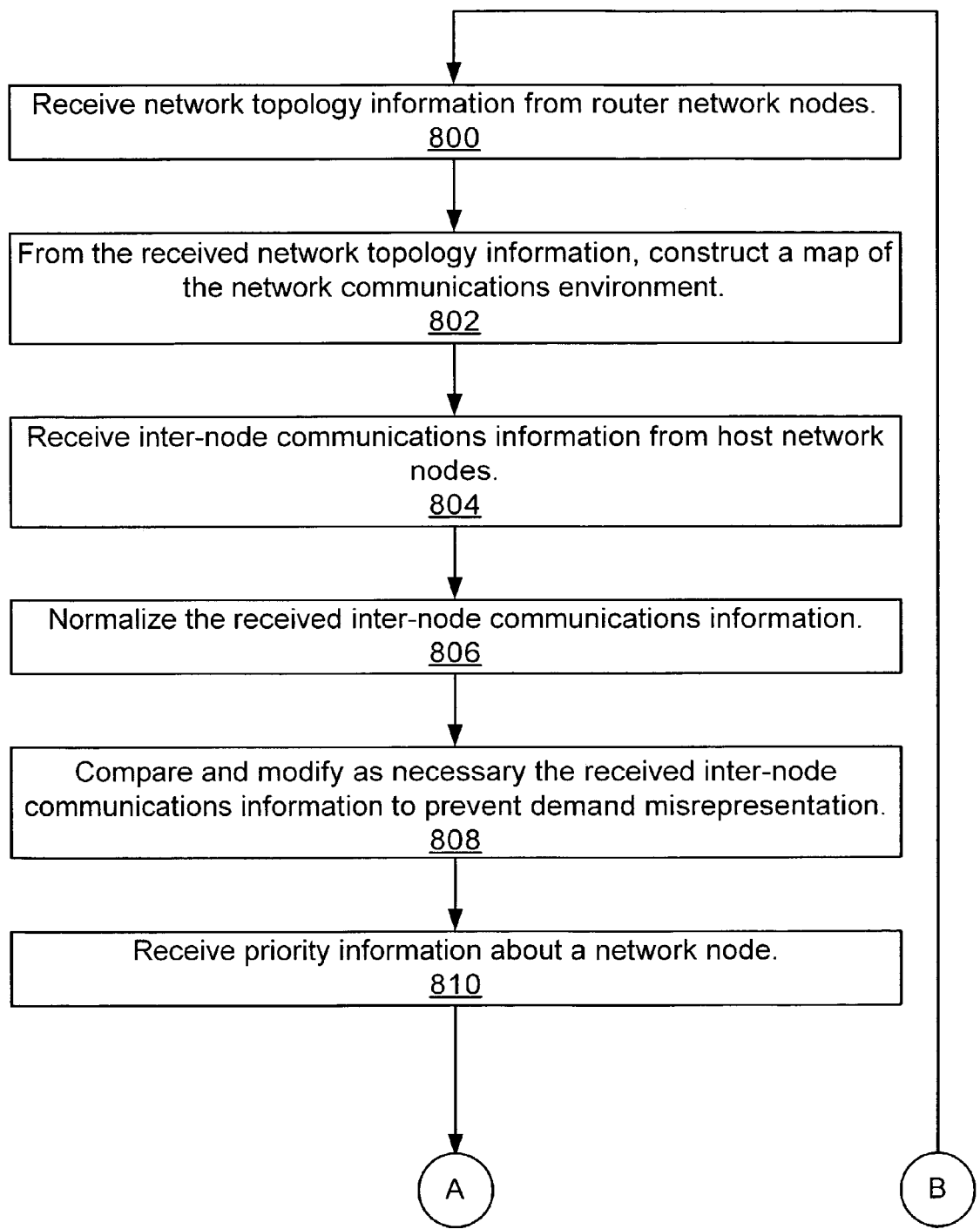

FIG. 10

Current Host/Router Network Node: 102     1000

| Destination | Next Hop | Probability |
|---|---|---|
| 104 | 104 | 1 |
| 106 | 106 | 1 |
| 108 | 104 | 1/2 |
| 108 | 106 | 1/2 |

FIG. 12

Current Router Network Node: 110

| Routing Direction | Bandwidth Allocation by Incoming Link |
|---|---|
| 1102 | 1104: 200/(200+300+700); 116: 300/1200; and 112: 700/1200 |
| 1104 | 1102: 500/(500+300+700); 116: 300/1500; and 112: 700/1500 |
| 116 | 1102: 500/(500+200+700); 1104: 200/1400; and 112: 700/1400 |
| 112 | 1102: 500/(500+200+300); 1104: 200/1000; 116: 300/1000 |

Zipf Max Fair

Lambda vs # of Nodes

METHOD AND SYSTEM FOR GLOBAL ROUTING AND BANDWIDTH SHARING

TECHNICAL FIELD

The present invention is related generally to computer network communications, and, more particularly, to providing routing and bandwidth allocation information.

BACKGROUND OF THE INVENTION

Upon receiving an incoming packet, a router decides on which of its outgoing links to send the packet. Routers in the Internet generally make this decision on the basis of the shortest path from the router to the packet's destination. The router independently and locally computes this shortest path to the packet's destination. Although the router can account for various routing metrics, such as the latency of its outgoing links, the capacity of those links, and the present load on the links, the router chooses the outgoing path independently of the actual communications patterns among the end hosts in the Internet.

This independent and localized decision-making process in the routing protocol has been critical to the scalability of the Internet: New routers and new links are easily added without having to recompute routing decisions for the entire Internet. However, this routing process can also produce inefficiencies, such as unnecessary shared bottlenecks when multiple routers choose to use the same, shortest, path and leave other paths underutilized.

Localized routing decisions are also often demonstrably unfair, that is, they enhance the communications characteristics of one data flow at an incommensurate cost to other data flows. A broadly accepted measure of fairness in data networks is called "max-min fairness." In a max-min fair allocation of resources, no consumer's allocation of resources can be increased without penalizing a consumer with a smaller allocation. Packet scheduling algorithms such as fair queuing and round-robin approximate max-min fairness for data flows across a single bottleneck link or router. However, such local, per-flow fairness is usually globally unfair because some communications nodes (hosts or routers) support several data flows.

Some networks allow multipath routing. Here, a router can send outgoing packets along paths other than the absolutely shortest one. Multipath routing allows significantly higher network throughput than single, shortest path routing. Multipath routing also yields a robustness to link failure that is unachievable with single, shortest path routing. Unfortunately, current per-flow or local bandwidth allocation implementations of multipath routing are sometimes even less fair than the more traditional single-path routing protocols.

SUMMARY OF THE INVENTION

In view of the foregoing, the present invention provides a routing and bandwidth allocation system that maximizes network throughput while maintaining global fairness in the sharing of network resources. From gathered global network information (such as inter-node communications patterns and network topology), routing tables and bandwidth allocation policies are computed for network routers. In some embodiments, the computations involve applying multi-commodity flow methods to provide a "max-fair" allocation of network resources.

While in some embodiments each router collects global network information and then locally produces its own routing and bandwidth allocation tables, it can be simpler and cheaper in terms of both computation and security for a centralized, trusted control unit to perform the calculations and then to distribute the results to the routers.

Embodiments of the present invention properly account for data flows differentiated by their levels of priority. Also, the computed bandwidth policies need not allocate all network bandwidth, but can leave some bandwidth unallocated to handle unexpected surges in demand. The computed routing tables can include multiple paths leading to greater link utilization and to robustness to link failure.

In some situations, inter-node communication patterns are aggregated during the computation of the routing and bandwidth allocation tables. For example, more accurate results are obtained by aggregating communications flows between Internet Service Providers (ISPs) because these flows change at a much slower time scale than do individual flows between end hosts. In the case of an enterprise network connected to the Internet through a gateway, acceptable results are obtained by managing only the communications through the gateway.

BRIEF DESCRIPTION OF THE DRAWINGS

While the appended claims set forth the features of the present invention with particularity, the invention, together with its objects and advantages, may be best understood following detailed description taken in conjunction with the accompanying drawings of which:

FIG. 5 is a data structure diagram of the inter-node communications information provided by a host network node in the architecture of FIG. 2;

FIG. 7 is a data structure diagram of the network topology information provided by a router network node in the architecture of FIG. 2;

FIGS. 8a and 8b together form a flowchart of an exemplary method usable by a control unit in the architecture of FIG. 2;

FIG. 10 is data structure diagram of an exemplary multipath routing table produced for one of the host network nodes in the environment of FIG. 9;

FIG. 12 is a data structure diagram of an exemplary bandwidth allocation table produced for the central router network node of FIG. 11;

FIG. 19b is a plot showing how, under Zipf demands, a max-fair bandwidth allocation policy can overprovision small demands;

DETAILED DESCRIPTION OF THE INVENTION

Figure 1:
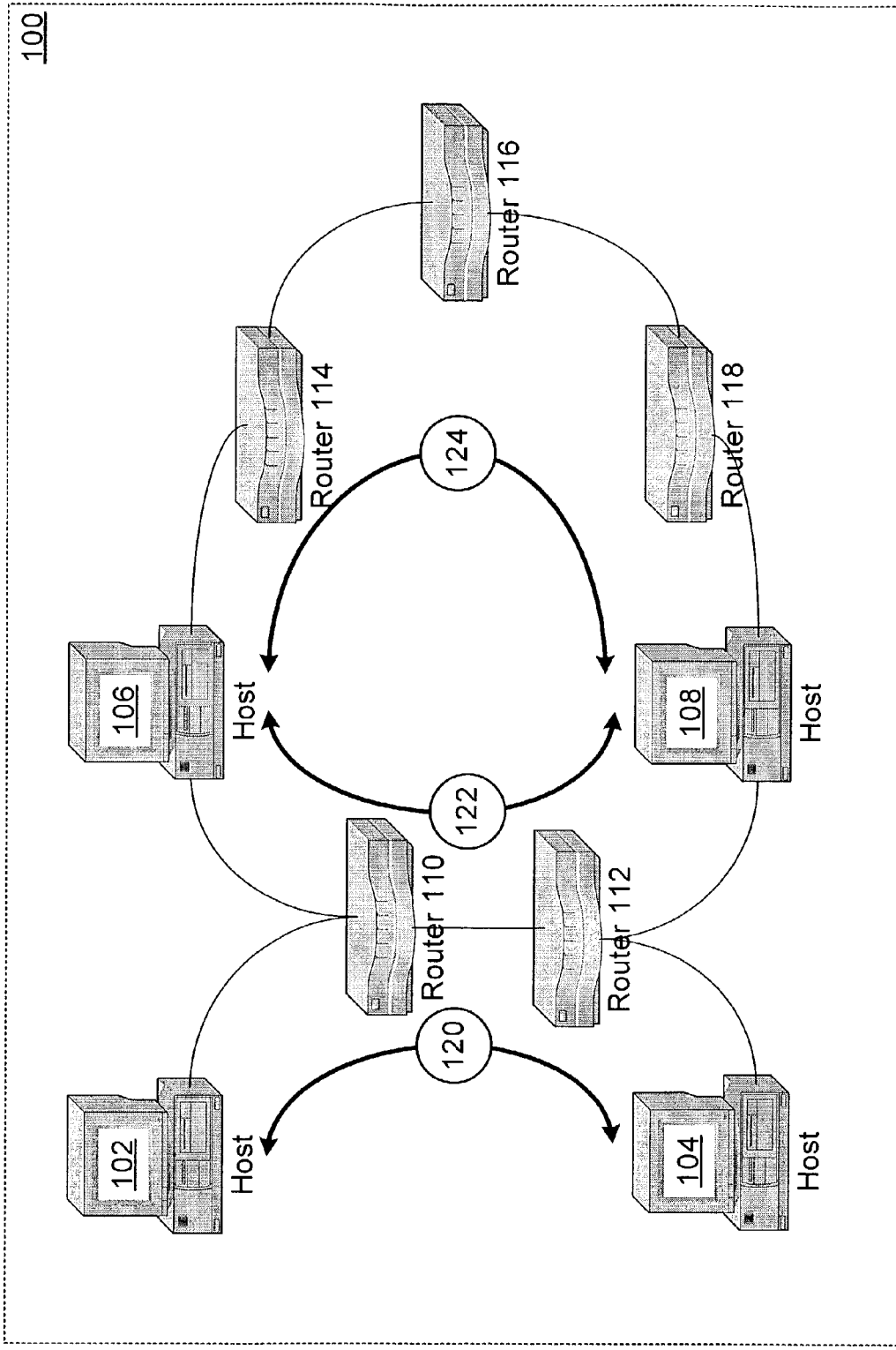
FIG. 1 is a block diagram of a communications environment showing how shortest path routing can lead to an unnecessary routing bottleneck.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein. Section I of this description presents an exemplary routing and bandwidth allocation architecture. Section II defines node-demand fairness as one metric usable with the present invention, and Section III presents a multi-commodity flow implementation of node-demand fairness. Finally, Section IV presents results of simulations of embodiments of the present invention.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Section I: An Exemplary Routing and Bandwidth Allocation Architecture

The present invention provides a routing and bandwidth allocation system that maximizes network throughput while maintaining global fairness in the sharing of network resources. From gathered global network information (such as inter-node communications patterns and network topology), routing tables and bandwidth allocation policies are computed for network routers.

The advantages of the present invention's use of global information over, for example, the localized decision-making commonly used by Internet routers is illustrated in FIG. 1. In FIG. 1, a network communications environment 100 includes sources and destinations of data flows. These sources and destinations are labeled "hosts" 102, 104, 106, and 108. Routers 110, 112, 114, 116, and 118 receive data flows from source hosts and send the flows on to their destination hosts. The labels "host" and "router" in FIG. 1 are purely for convenience in the present discussion as some devices can act as both host and router.

When the host 102 wishes to communicate with the host 104, the shortest path for their data flows, that is, the path that would be chosen by current Internet routers, is the path labeled 120, passing through routers 110 and 112. When the host 106 wishes to communicate with the host 108, their shortest data path 122 also passes through these routers 110 and 112. Shortest path routing thus causes the link connecting the routers 110 and 112 to become an unnecessary bottleneck. The bottleneck is unnecessary because shortest path routing leaves unused the alternate path 124 between the hosts 106 and 108 as that path 124 is longer than the chosen path 122. The methods of the present invention use global network information to avoid creating such unnecessary bottlenecks and thus to improve network utilization.

Figure 2:
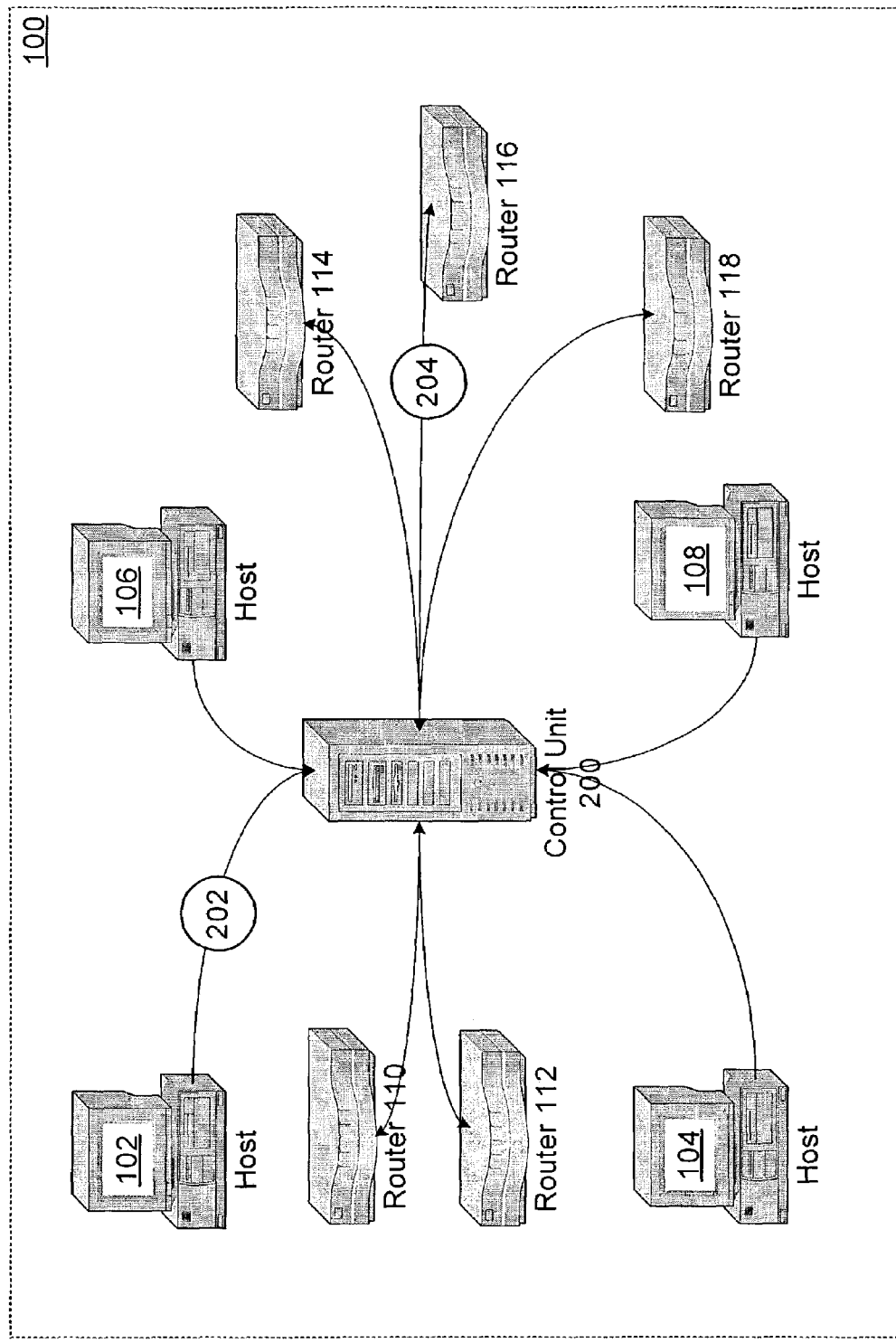
FIG. 2 is a block diagram of an exemplary architecture supporting an embodiment of the present invention.

FIG. 2 presents an exemplary architecture for implementing the present invention. Network hosts 102, 104, 106, and 108 periodically send information about their expected communications demands to a centralized control unit 200 (as illustrated by the data flow 202). Network routers 110, 112, 114, 116, and 118 periodically send network topology information to the control unit 200 (data flow 204). The control unit 200 uses this network information to make globally efficient and fair routing decisions. It then sends routing and bandwidth allocation tables to the routers (also data flow 204). By using the received routing and bandwidth allocation tables, the routers put into practice the control unit 200's globally efficient and fair policies. The remainder of this Section I presents implementation considerations and details of the architecture of FIG. 2.

It should be noted that while the architecture of FIG. 2 is generally applicable to all networks, both the amount of data gathered by the control unit 200 and the amount of computation used to form routing and allocation policies from that information increase with the size of the network. Thus, the methods of the present invention are most easily implemented for smaller networks (e.g., networks of only a few hundred routers). However, this does not severely limit the applicability of the present invention for at least two reasons. First, optimizing routing and allocation within smaller networks is itself a worthwhile goal. Examples of smaller networks amenable to the methods of the present invention include enterprise virtual private networks with firewalls to the Internet, wired or wireless neighborhood networks where hosts communicate with one another and share Internet access through gateways, and peering among ISPs. The latter example also illustrates the second reason why the present invention is not severely limited: Many larger networks can be modeled as a hierarchy of smaller networks. The present invention can then be applied at an appropriate level in the hierarchy. For example, in the case of ISP peering, each ISP is modeled as a single node, and the actual details of the implementation of each ISP's network do not much affect the routing and allocation policies for the links connecting the ISPs.

Figure 3:
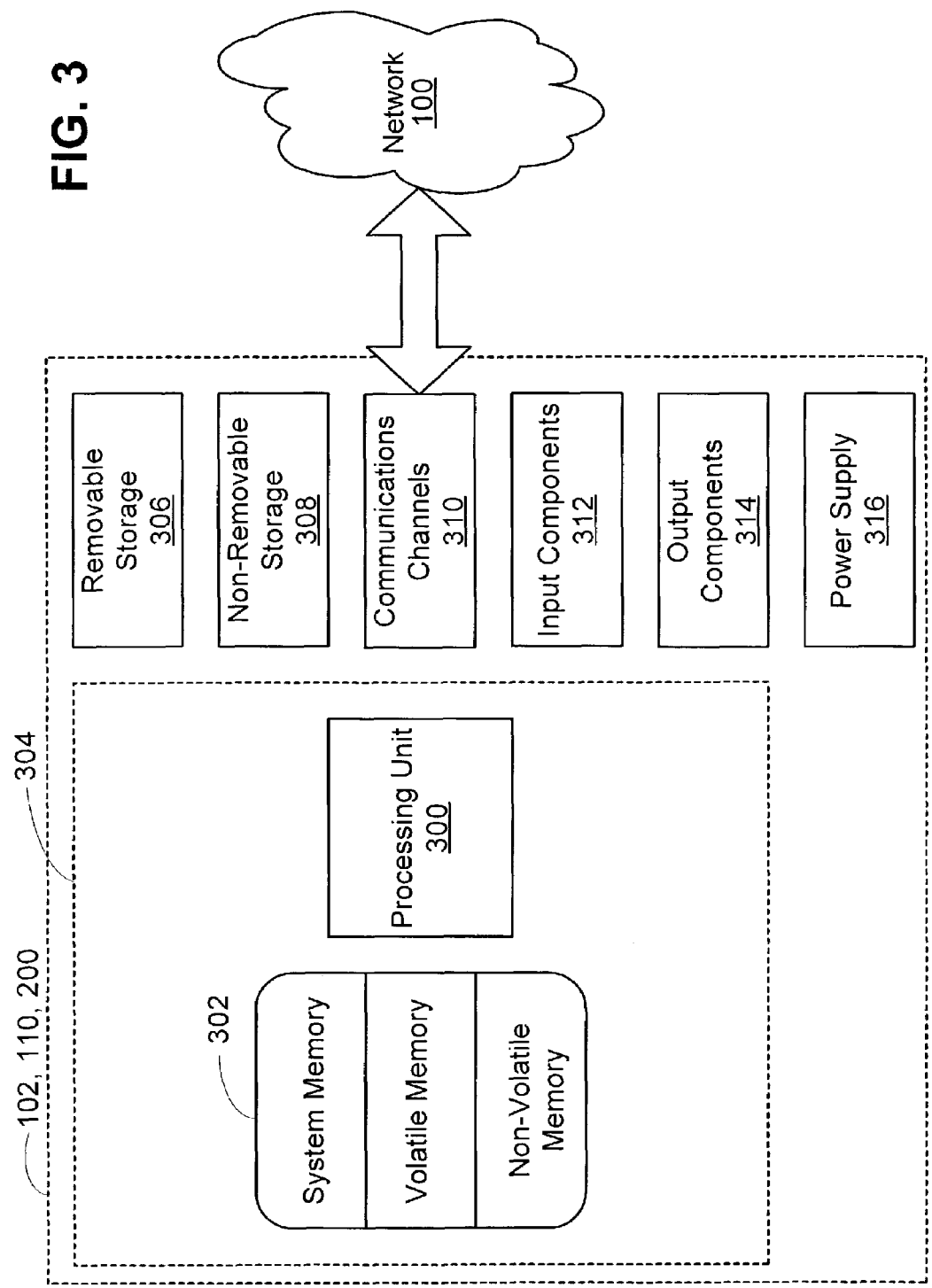
FIG. 3 is a schematic diagram generally illustrating an exemplary computer system that supports the present invention.

The hosts 102, 104, 106, and 108, the routers 110, 112, 114, 116, and 118, and the control unit 200 of FIG. 2 may be of any architecture. FIG. 3 is a block diagram generally illustrating an exemplary computer system that supports the present invention. The computer system of FIG. 3 is only one example of a suitable environment and is not intended to suggest any limitation as to the scope of use or functionality of the invention. Neither should the computing devices 102, 110, and 200 be interpreted as having any dependency or requirement relating to any one or combination of components illustrated in FIG. 3. The invention is operational with numerous other general-purpose or special-purpose computing environments or configurations. Examples of well known computing systems, environments, and configurations suitable for use with the invention include, but are not limited to, personal computers, servers, hand-held or laptop devices, tablet devices, multiprocessor systems, microprocessor-based systems, set-top boxes, programmable consumer electronics, network PCs, minicomputers, mainframe computers, and distributed computing environments that include any of the above systems or devices. In its most basic configuration, the computing device 102 typically includes at least one processing unit 300 and memory 302. The memory 302 may be volatile (such as RAM), non-volatile (such as ROM or flash memory), or some combination of the two. This most basic configuration is illustrated in FIG. 3 by the dashed line 304. The computing device 102 may have additional features and functionality. For example, the computing device 102 may include additional storage (removable and non-removable) including, but not limited to, magnetic and optical disks and tape. Such additional storage is illustrated in FIG. 3 by removable storage 306 and by non-removable storage 308. Computer-storage media include volatile and non-volatile, removable and non-removable, media implemented in any method or technology for storage of information such as computer-readable instructions, data structures, program modules, or other data. Memory 302, removable storage 306, and non-removable storage 308 are all examples of computer-storage media. Computer-storage media include, but are not limited to, RAM, ROM, EELPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by device 102. Any such computer-storage media may be part of device 102. Device 102 may also contain communications channels 310 that allow the device to communicate with other devices. Communications channels 310 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, RF, infrared, and other wireless media. The term "computer-readable media" as used herein includes both storage media and communications media. The computing device 102 may also have input devices 312 such as a keyboard, mouse, pen, voice-input device, tablet, touch-input device, etc. Output devices 314 such as a display (which may be integrated with a touch-input device), speakers, and printer may also be included. All these devices are well known in the art and need not be discussed at length here.

Figure 4:
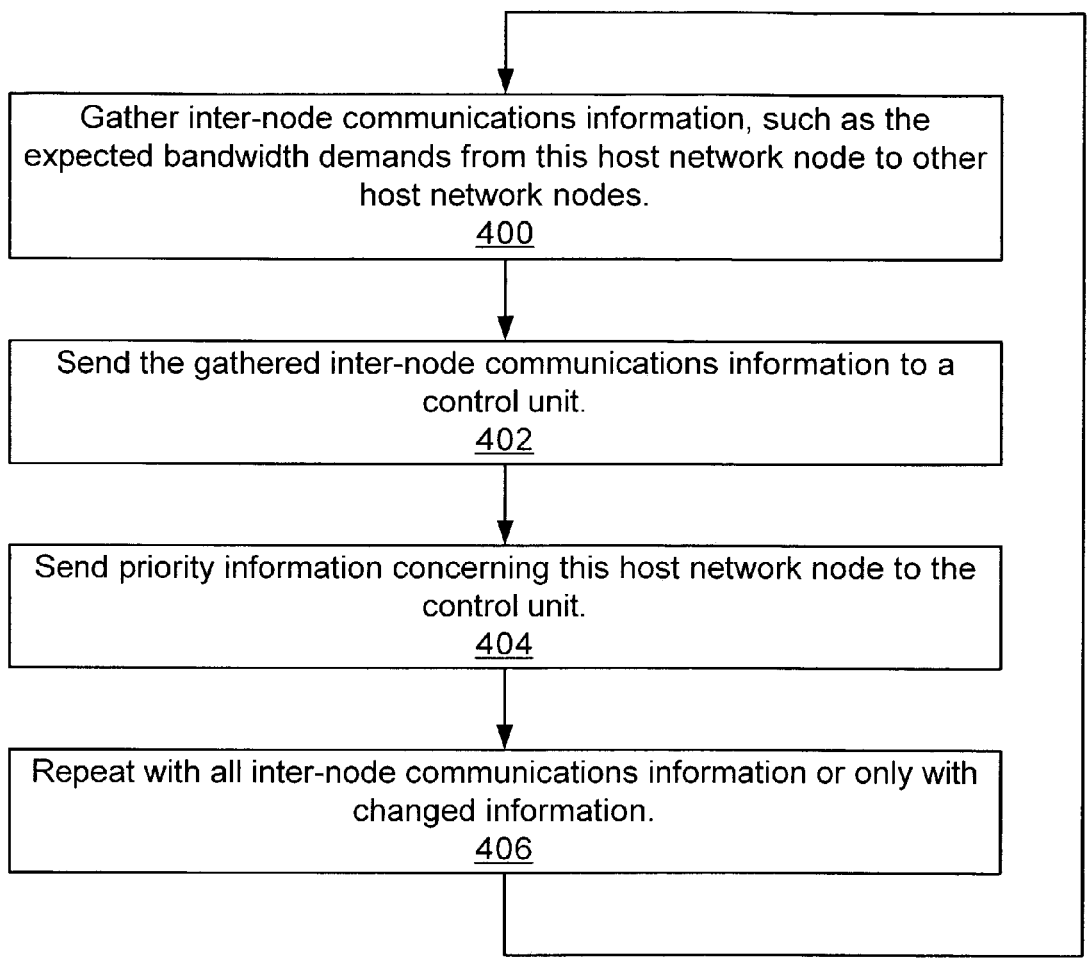
FIG. 4 is a flowchart of an exemplary method usable by a host network node in the architecture of FIG. 2.

FIG. 4 presents an exemplary method usable by a host node, such as the host node 102, in the architecture of FIG. 2. In step 400, the host node 102 gathers information about its inter-node communications needs and, in step 402, sends the gathered information to the control unit 200.

The inter-node communications information takes different forms in different embodiments. FIG. 5 provides an example. The information 500 identifies the host node 102 and identifies the expected amounts of data to be sent from the host node 102 to other host nodes. Many methods for estimating these data flows are known in the art. Suffice it to say that these estimates can be quite-accurate when the host node 102 is actually a router and when the data flows represent historical averages of data flows to other routers.

Section III presents a detailed analysis of the inter-node communications information 500. For the present, note that the amount of information 500 generated by each host node is small for small networks, the amount being proportional to the number of host nodes in the network.

Returning to FIG. 4, in step 404 the host node 102 can tell the control unit 200 the priority of the host node 102's data flows. In the example of FIG. 5, all of the data flows originating at the host node 102 have been assigned a priority of 2. In other embodiments, each data flow is given its own priority. A mechanism should exist for coordinating the assignment of these priorities, else every host node would upgrade the priority of its own flows until the priorities became meaningless. In one scenario, priorities are set by the control unit 200, possibly reflecting contractual agreements between the host nodes and the control unit 200. In this scenario, there is no need for the host node 102 to inform the control unit 200 of the priorities. In another scenario, an authority other than the control unit 200 sets the priorities and sends the priority information to the host nodes. An authentication certificate, well known in the art, accompanies the priority information 500 sent from the host node 102 to guarantee that the reported priorities have been legitimately assigned.

In step 406, the host node 102 repeats the above process. The repetition can be periodic or can be invoked whenever the inter-node communications information 500 changes.

Figure 6A:
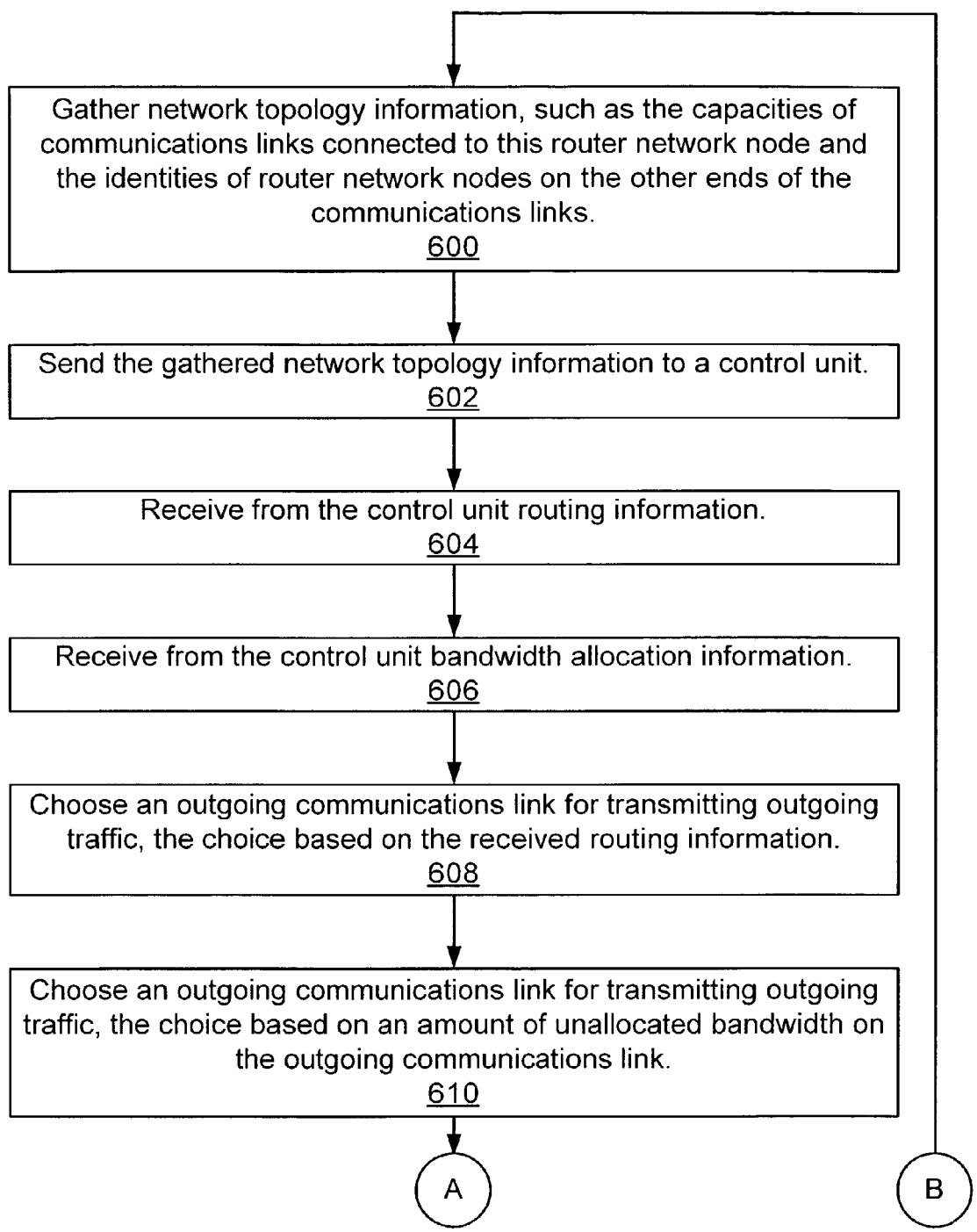
FIGS. 6a and 6b together form a flowchart of an exemplary method usable by a router network node in the architecture of FIG. 2.
Figure 6B:
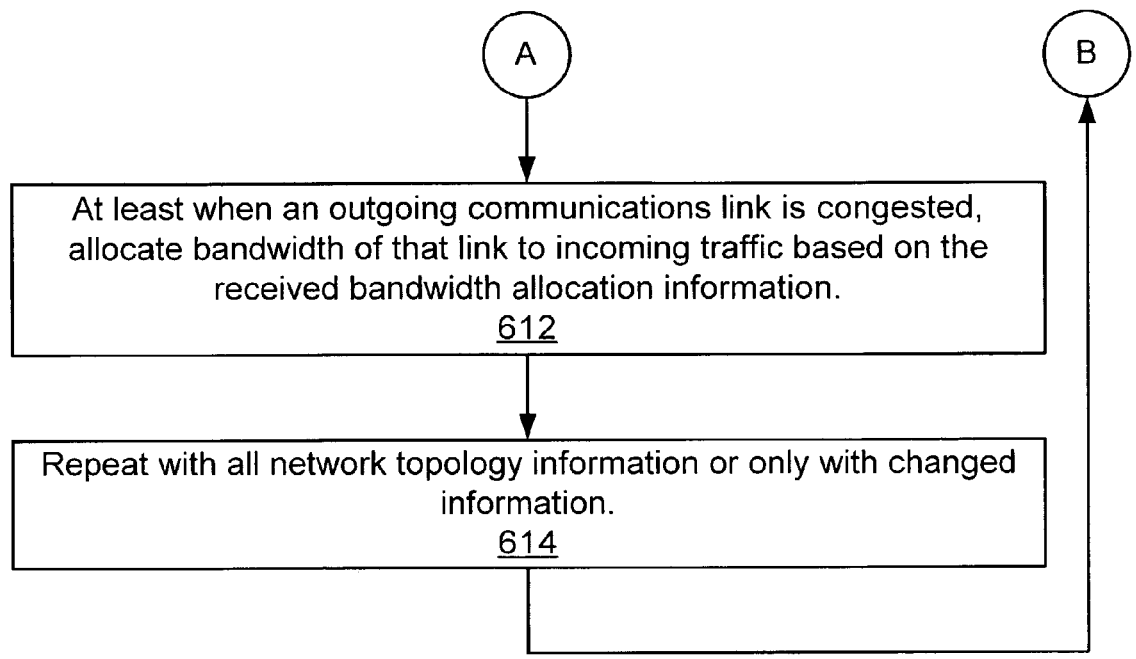

An exemplary router in the architecture of FIG. 2, such as the router 110, uses the method presented in FIGS. 6a and 6b. In step 600, the router 110 gathers information about the topology of that portion of the network environment 100 nearest to itself and, in step 602, sends the gathered network topology information to the control unit 200.

The gathered topology information can take the form of the well known Link Statement Announcement. FIG. 7 provides an example of the topology information 700 gathered by the router 110. The information 700 identifies the router providing this topology information and then presents a table of the communications links connected to this router 110. For each communications link is given the capacity of the link, an identification of the router at the other end of the link, and the current state of the link.

Returning to FIG. 6a, the router 110 receives from the control unit 200 routing and bandwidth allocation tables in steps 604 and 606, respectively. Examples of these tables are discussed below in relation to FIGS. 9 through 12.

When the router 110 receives an incoming data packet, it uses the received routing table in step 608 to choose an outgoing link for the data packet. In some embodiments, the control unit 200 does not allocate all of the bandwidth of all of the communications links in the network environment 100. The unallocated bandwidth is a reserve that is called upon for sending outgoing packets in step 610. The reserve bandwidth is useful for handling unexpected or infrequent surges in demand.

The router 110 can, in most situations, rely solely on the routing table received from the control unit 200 and ignore the received bandwidth allocation table. However, when one of the router 110's outgoing communications links becomes congested in step 612, the router 110 uses that table to allocate bandwidth on the congested outgoing link among the incoming data packets. By doing so, the router 110, along with the other routers in the network environment 100, implements the global fairness policies created by the control unit 200.

Just like the host node 102 above, the router 110, in step 614, repeats the steps of the above method. The router 110 sends updated topology information, either periodically or when the topology information 700 changes.

Figure 8B:
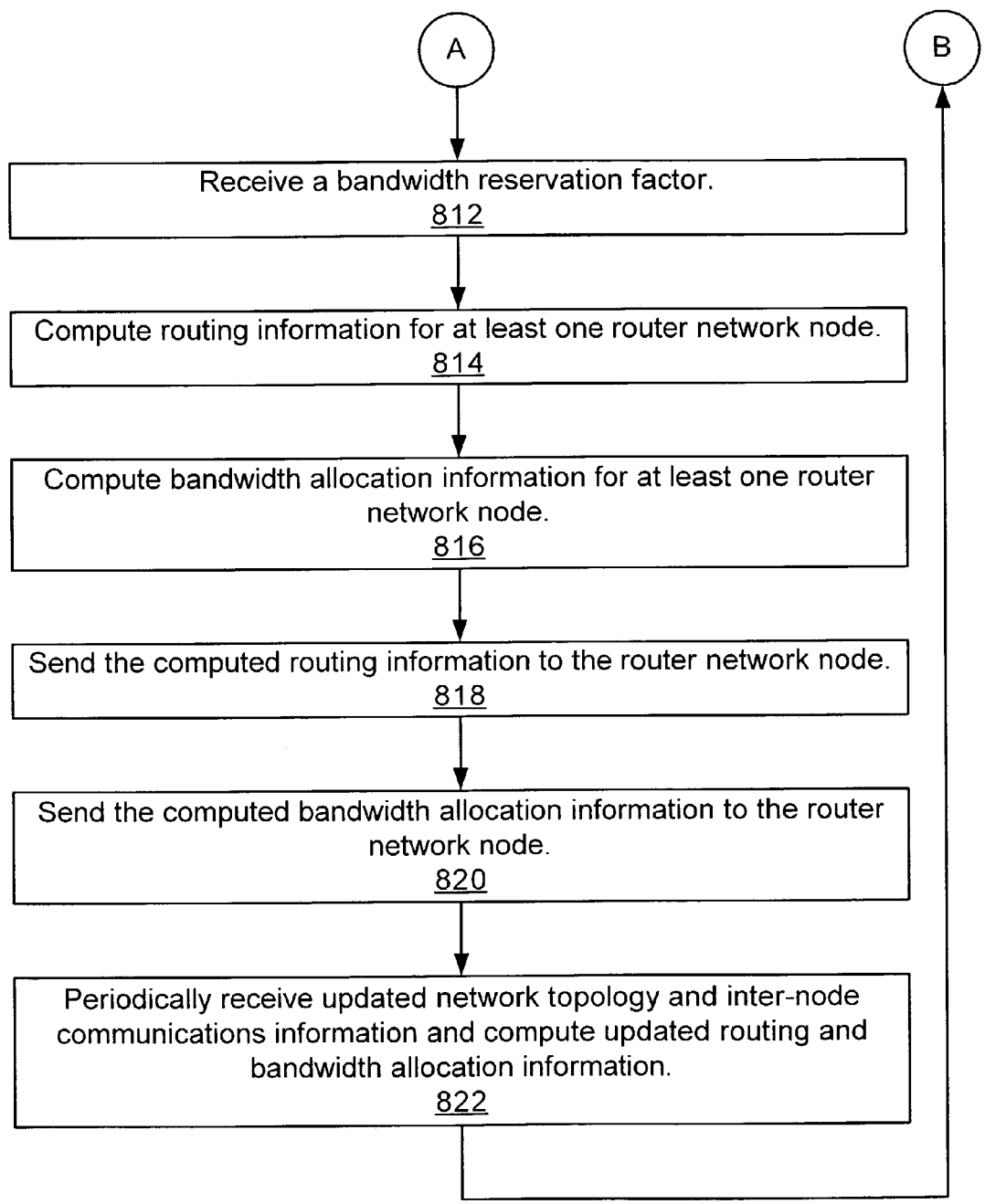

The control unit 200 codifies its global efficiency and fairness policies by creating the routing and bandwidth allocation tables. An exemplary method usable by the control unit 200 is depicted in FIGS. 8a and 8b. In step 800, the control unit 200 receives the topology information 700 as sent by routers in step 602 of FIG. 6a. Then in step 802, the control unit 200 uses the received information 700 to construct a map of the network environment 100. Note that this description of step 802 is meant for illustrative purposes only: Many techniques are well known for compiling sets of local topological descriptions 700 into a logical whole and not all of these techniques call for the creation of a network map in any sense.

The control unit 200 receives in step 804 the inter-node communications information 500 as sent by the hosts in step 402 of FIG. 4. In some embodiments, the control unit 200 then normalizes this information 500 in step 806. Normalization involves expressing the expected data flow rates as percentages of each host's total expected outbound traffic and is discussed below in Section III.

Step 808 is another optional step. To prevent demand misrepresentation, the control unit 200 compares the data flow demand reported by Node A toward Node B with the demand reported by Node B toward Node A. The control unit 200 then replaces the greater of the two demand figures with the lesser. As discussed below in Section III, this simple replacement removes the incentive for a selfish host node to over-report its demand in order to receive a larger allocation of bandwidth.

As discussed above in relation to step 404 of FIG. 4, data flows can be assigned priorities. The control unit 200 receives this priority information in step 810. If no priority information is received, then the control unit 200 treats all data flows as being of equal priority.

The control unit 200 need not allocate all of the available bandwidth in the network environment 100, but can rather reserve some bandwidth for emergency use. Step 812 of FIG. 8b has the control unit 200 receiving a factor showing the fraction of the available bandwidth to keep in reserve. Of course, more elaborate reservation procedures are possible, some varying with time of day, some with different communications links having different reservation factors.

In steps 814 and 816, the control unit 200 uses the received inter-node communications information 500 and the received topology information 700 to calculate routing and bandwidth allocation tables for the routers in the network environment 100. The control unit 200 performs these calculations in such a way as to achieve certain network policy goals such as global network efficiency and fair sharing of network resources. Because the methods of these calculations can be quite involved, and because they are central to an understanding of the methods of the present invention, an in-depth discussion of them is deferred to Sections II and III below.

In steps 818 and 820, the control unit 200 sends the resulting routing and bandwidth allocation tables to the routers. By following the dictates of these tables, the routers implement the global efficiency and fair sharing policies of the control unit 200.

Step 822 shows that the control unit 200 repeats the above process either periodically or as necessary when the incoming information 500 and 700 changes. For example, the control unit 200 can set a timer for all routers to refresh their link state information 700. If a router 110 fails to report in a timely fashion, then the control unit 200 can remove that router 110 and its associated links from the current topology. (The timer value should be some multiple of the refresh period.) Until the timeout, the unaffected portions of the network environment 100 continue to function. Upon the timeout, the control unit 200 recalculates the routing and bandwidth allocation tables (steps 814 and 816) and distributes the new tables to the affected routers (steps 818 and 820). The time needed by the control unit 200 to respond to the failure of the router 110 is the same as for existing link state protocols.

The above discussion of FIGS. 2 through 8 is meant to be taken as describing the logical functions of host, router, and control unit. In some network environments 100, a single physical device can perform two of these functions or even all three. Each router can receive the inter-node communications information 500 and topology information 700 itself and can calculate its own routing and bandwidth allocation tables accordingly. It is often better, however, for a centralized control unit 200 to perform the calculations of steps 814 and 816 for the other routers in the network environment 100. A centralized control unit 200 is easier to maintain and, as a single point of trust, the control unit 200 is much easier to protect and to authenticate than is a distributed set of routers.

The possibility that a centralized control unit 200 can become a single point of failure or a routing bottleneck should not be worrisome because the control unit 200 is only a control entity and cannot become a routing bottleneck. Also, using known techniques, a backup control unit can be deployed to take over if the control unit 200 fails. In some scenarios, each router is capable of acting as the central control unit for all of the routers, with the routers taking turns or taking over from fallen comrades.

Figure 9:
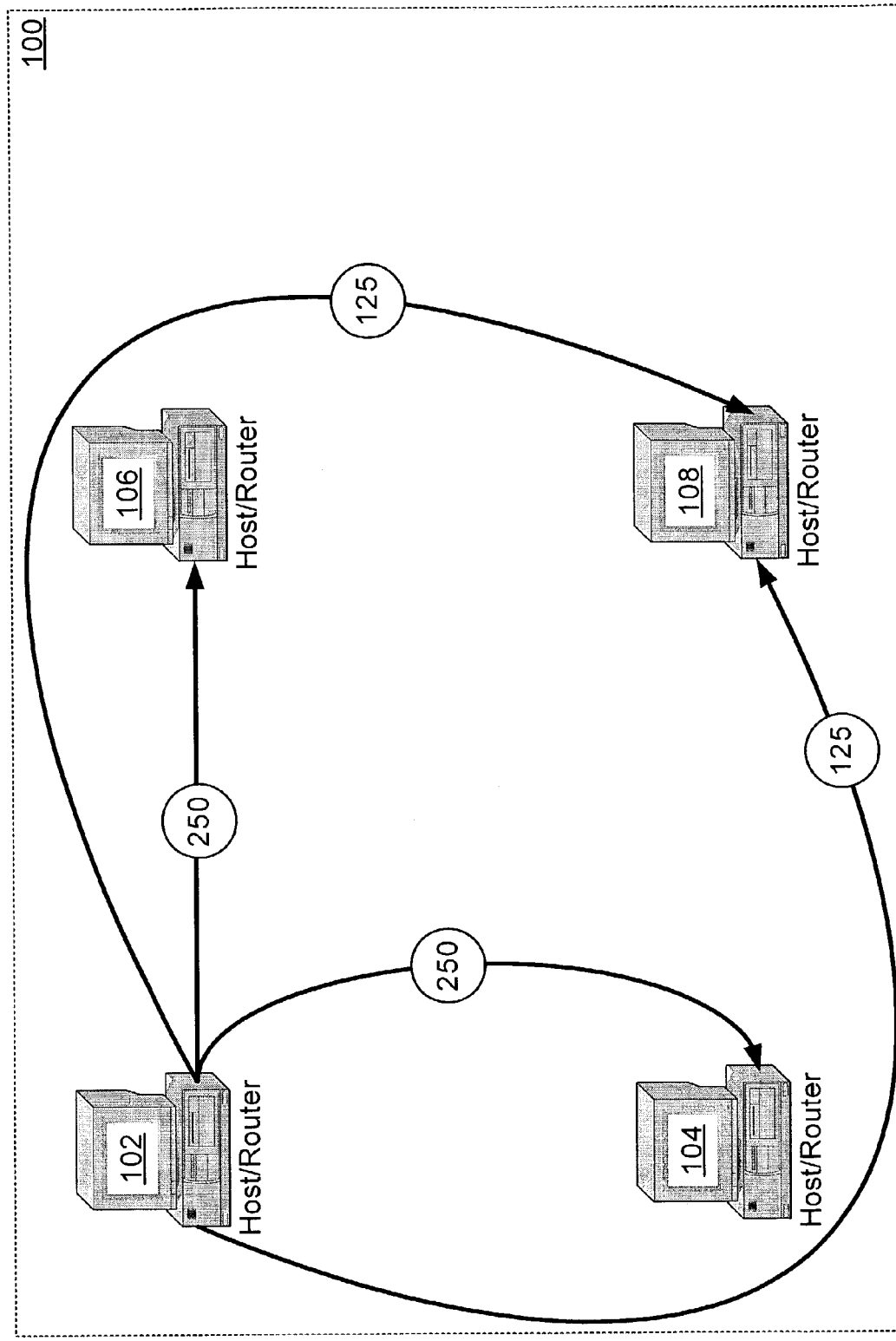
FIG. 9 is a flow rate diagram of an exemplary communications environment with a first host network node sending data to three other host network nodes.

As an example of the above techniques, consider the network environment 100 of FIG. 9. Here, every node 102, 104, 106, and 108 is both a host and a router. The expected inter-node communications demands of the host/router node 102 are those illustrated in FIG. 5: To each host/router node 104, 106, and 108, the host/router node 102 expects to send 250 Kbps of traffic. The network environment 100 includes communications links directly connecting the host/router node 102 to the host/router nodes 104 and 106, but no such direct link exists to the host/router node 108. Each communications link has a capacity of say, 1 Mbps, well in excess of the expected demand.

One possible routing table produced by the methods of the present invention and sent to the host/router node 102 is illustrated in FIG. 10. A routing table 1000 includes a destination node, a next hop node and a probability for each entry. As would be expected, traffic from the host/router node 102 to its neighboring nodes 104 and 106 is sent directly, with no intermediaries. The routing of traffic to the non-neighboring node 108 is more interesting. Rather than choosing a single, shortest path, the routing table 1000 specifies that the traffic be split evenly between two paths, half going through node 104 and the other half through node 106. This "multipath" routing solution greatly enhances the utilization of network resources. However, multipath routing poses a challenge to transport layer protocols because of the possibility of out-of-order packet delivery. Several solutions have been proposed to this challenge, but no one of them has yet achieved dominance in the field.

Figure 11:
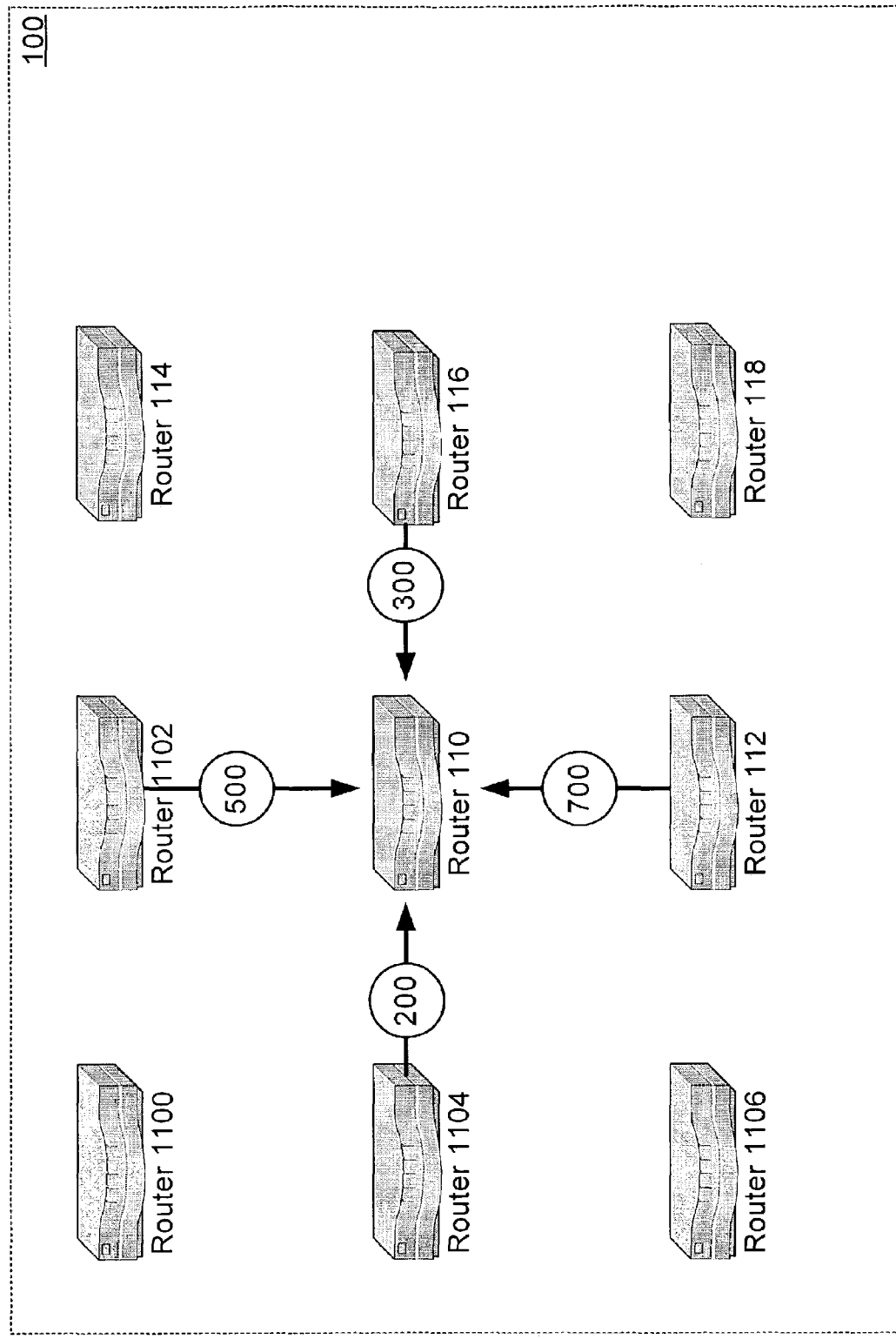
FIG. 11 is a flow rate diagram showing aggregate data flows coming into a router network node.

As another example, consider FIG. 11 which shows the aggregate data flow rates coming into a router 110. These rates are calculated by the control unit 200 (not shown in FIG. 11) as it processes the inter-node communications information 500 and the local topology information 700. From these aggregate data rates, the control unit 200 produces the bandwidth allocation table 1200 of FIG. 12. When an outgoing communications link ("routing direction" in table 1200) connected to the router 110 becomes congested, the router 110 consults the bandwidth allocation table 1200 to determine how much of that outgoing link's bandwidth to allocate to traffic coming in on each incoming link.

Note that, unlike traditional packet scheduling algorithms, the present invention need not track individual data flows, rather it only tracks the aggregate traffic flow on each incoming communications link. This simplifies the calculations in steps 814 and 816 of FIG. 8b by reducing the amount of state information kept by the control unit 200. Minimizing the amount of state information is a significant engineering concern in router design. While traditional packet scheduling algorithms require an amount of state information proportional to the number of data flows (which can be of the order of the square of the number of nodes in the system or more), methods of the present invention use an amount of state information proportional to the number of neighbors of a router, which amount is much smaller.

Section II: Node-Demand Fairness

Figure 13A:
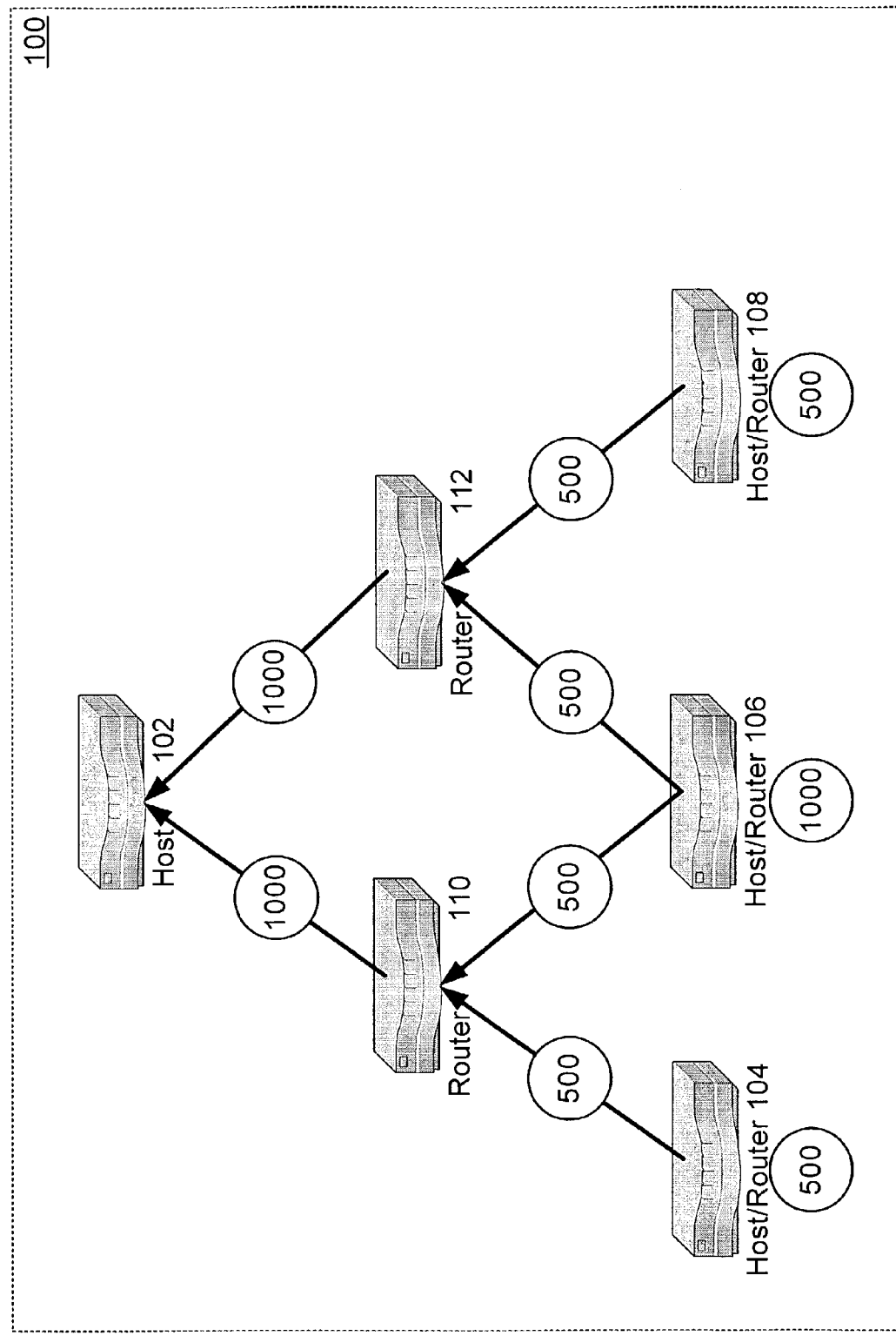
FIG. 13a is a flow rate diagram of an exemplary communications system using a local per-flow fairness policy.
Figure 13B:
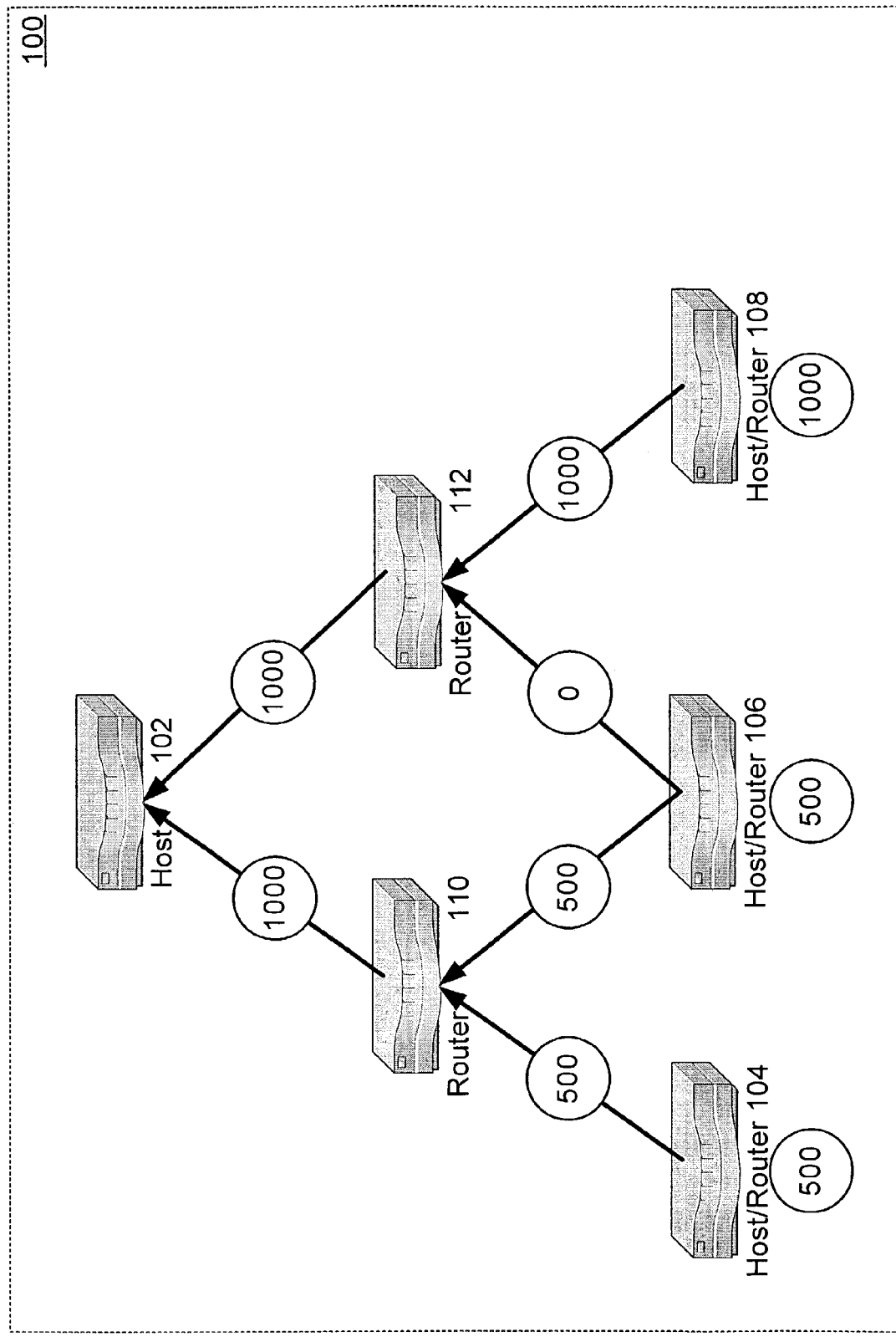
FIG. 13b is a flow rate diagram of the same communications system using a single-path routing policy.
Figure 13C:
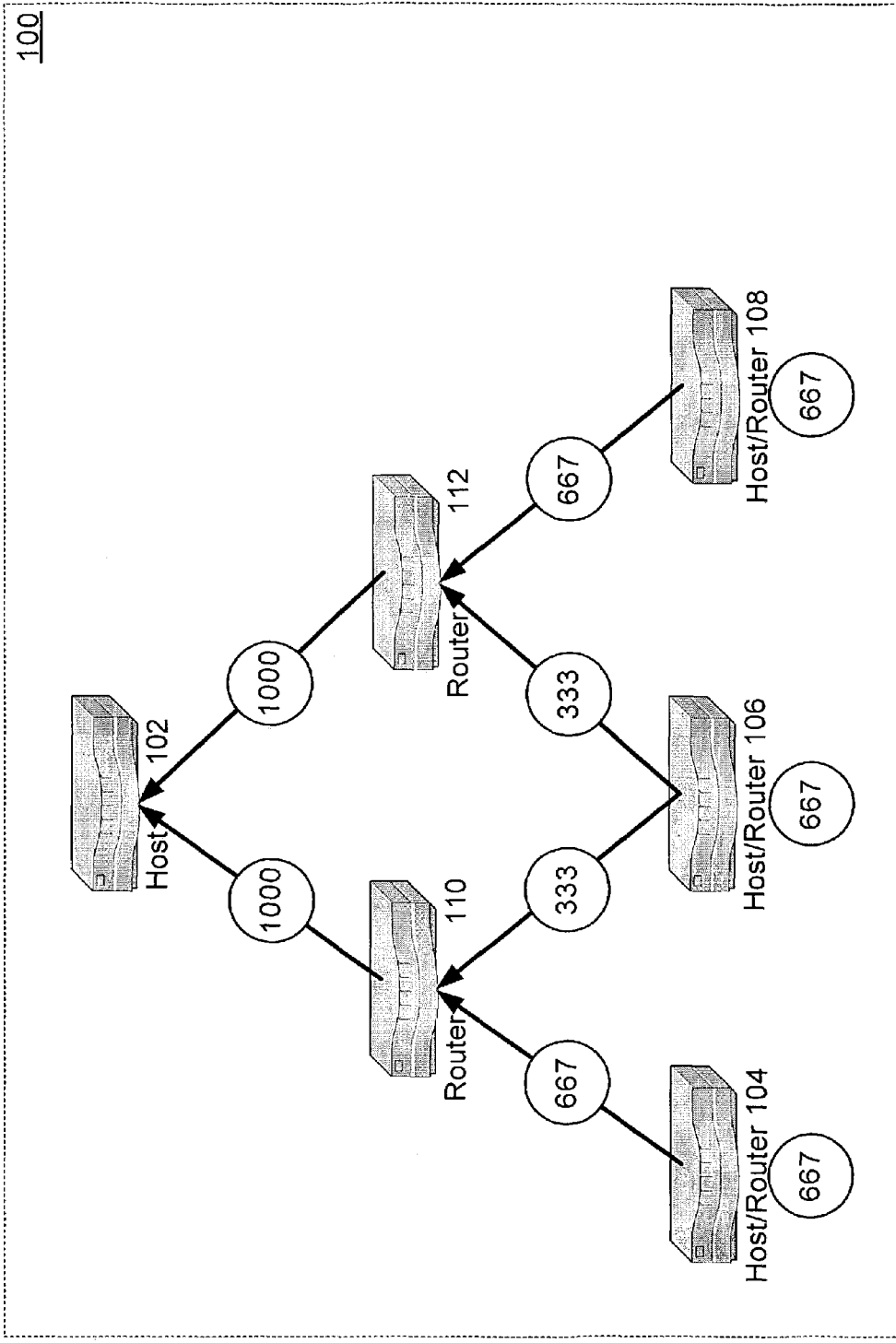
FIG. 13c is a flow rate diagram of the same system using a node-demand-fairness policy.

This Section defines node-demand fairness as one metric usable by the control unit 200 in calculating the routing and bandwidth allocation tables. The motivation for node-demand fairness stems from the observation that local, per-flow-based packet scheduling algorithms proposed for the Internet are not designed to, and do not, provide global fairness. FIGS. 13a, 13b, and 13c illustrate this observation. In the Figures, each communications link in the network environment 100 has a capacity of 1000 Kbps. The host/router nodes 104, 106, and 108 each wish to communicate with the host node 102 at the highest possible rate. The host/router nodes 104, 106, and 108 have the ability to route their traffic onto multiple paths if such paths are available.

In FIG. 13a, the two intermediate router nodes 110 and 112 each apply a local per-flow fairness policy. The result is that the middle host/router node 106 receives an unfairly large share of the network bandwidth at the expense of the other two host/router nodes 104 and 108.

It might appear that this inequity in resource allocation stems from the fact that only the central host/router node 106 has access to multiple data paths. That, however, is not the cause of the inequity. A single-path routing allocation results in the data flows of FIG. 13b, an allocation which is equally unfair.

The inequity of FIG. 13b can be cured by simply reducing the bandwidth allocation for the rightmost host/router node 108 to 500 Kbps. Every host/router node 104, 106, and 108 would then experience the same throughput, but at the clear cost of an undesirable waste of network capacity. This "punishment" of the host/router node 108 does not benefit the other two host/router nodes 104 and 106.

FIG. 13c shows the best routing and bandwidth allocation for this scenario. Although the network throughput is the same as in FIGS. 13a and in 13b (13a: 500 Kbps+1000+ 500=2000 Kbps; 13b: 500 Kbps+500+1000=2000 Kbps; 13c: 667 Kbps+667+667 2000 (with rounding)), in FIG. 13c each host/router node 102, 104, and 106 receives the maximum possible fair bandwidth allocation. This desirable routing and bandwidth sharing is due to the use both of multipath routing and of global bandwidth allocation. These are key elements of a node-demand fair mechanism.

Intuitively, node-demand fairness can be thought of as global max-min fairness without any routing path constraints and where the nodes (rather than the data flows) are the sharing/competing entities. In other words, node-demand fair routing and bandwidth allocation can use multipath routing and can maximize the minimum throughput for each node. In contrast, the routing and bandwidth allocation of FIG. 13b maximizes the minimum throughput of each node subject to constraint of single-path routing, but this constraint makes the higher minimum throughput (667 Kbps) of FIG. 13c unachievable.

Section III: A Multi-Commodity Flow Implementation of Node-Demand Fairness

One way to calculate node-demand fair routing and bandwidth allocation solutions is to use the established methods of multi-commodity flow. In a multi-commodity flow problem, a number of distinct commodities are shipped across a shared transportation network. The network consists of nodes connected by links (called "edges"), each link having a specified capacity. Each commodity has a source, a destination, and a level of demand. A commodity travelling through the network can be split into multiple pieces and can be recombined at any node, but the same amount of the commodity must enter and leave each node, except at the source and destination nodes of that commodity.

The multi-commodity flow problem can admit various objectives. Two common objectives are the maximization of the sum of the flows, that is, the maximum throughput flow, and the maximization of the minimum flow, that is, the maximum concurrent flow. To map a node-demand fair problem to a multi-commodity flow, the communications network is represented as a graph, and the total communications flow between a pair of nodes is represented by a single commodity. The multi-commodity flow problem is then solved for the maximum concurrent flow.

Solving the multi-commodity flow problem is more practical for smaller networks than for larger networks. For any size network, however, the multi-commodity flow solution defines an optimum against which can be compared any practically achievable result.

The multi-commodity flow problem can be usefully modeled as a linear program. The constants and variables of the linear program are presented below in Tables 1 and 2, respectively.

TABLE 1

Multi-Commodity Flow Constants

| Constant: | Definition: |
|---|---|
| V | a set of nodes |
| i, j | elements of V |
| k | a commodity |
| $s_k$ | the source of the commodity k |
| $d_k$ | the destination of the commodity k |
| $w_k$ | the minimum demand for the commodity k |
| E | a set of edges |
| $c_{i,j}$ | the capacity of a link between i and j |

TABLE 2

Multi-Commodity Flow Variables

| Variable: | Definition: |
|---|---|
| $f_k$ | the net flow of the commodity k |
| $x_{i,j,k}$ | the flow of the commodity k from i to j |

The liner programming constraint set (1) below specifies that the directed flow of any commodity on any edge must be positive. The constraint set (2) specifies that the sum of all the commodity flows on any edge cannot exceed the capacity of that edge. Constraint set (3) enforces flow conservation: For any commodity, an equal amount enters and leaves any node other than at that commodity's source and destination nodes. The set (4) defines $f_k$, the total flow for commodity k, as the net amount of commodity k leaving its source. Set (4) is not a constraint of the linear program.

$$x_{i,j,k} \geq 0 \forall k, \forall (i, j) \in E \quad (1)$$

$$\sum_k (x_{i,j,k} + x_{j,i,k}) \leq c_{i,j} \forall (i, j) \in E \quad (2)$$

$$\sum_{j:(i,j) \in E} (x_{i,j,k} - x_{j,i,k}) = 0 \forall k, \forall i \in V, \{s_k, t_k\} \quad (3)$$

$$\sum_{j:(s_k,j) \in E} (x_{s_k,j,k} - x_{j,s_k,k}) = f_k \forall k \quad (4)$$

Additional features can be incorporated by adding auxiliary constraints. For example, the following dispersion constraints guard against link and node failure.

$$x_{i,j,k} \leq \alpha_1 f_k \forall k, \forall (i, j) \in E$$

$$\sum_{j:(i,j) \in E} x_{i,j,k} \leq \alpha_2 f_k \forall k, \forall i$$

The first set of dispersion constraints above ensures that at most a fraction $\alpha_1$ of any flow is routed along a single link. This adds resilience to link failure. The second set guards against node failure by ensuring that at most a fraction $\alpha_2$ of any flow is routed through a particular node.

The following linear program objective function defines the maximum throughput flow.

$$\max \sum_k f_k$$

By specifying the maximum concurrent flow objective function, the linear program maximizes the fraction of each demand that is allocated. For brevity, this is called the fair formulation. In this formulation, λ measures the minimum fraction of demand allocated over all flows.

$$\max \lambda$$

$$w_k \lambda = f_k \forall k$$

There is an inherent tension between absolute fairness (that is, equal usage) in resource sharing and maximum utilization. Max-min fairness treats this tension with N iterations of linear programming, where N is the number of nodes in the network. At each iteration, the linear program tries to maximally utilize the remaining resources fairly. For computational efficiency, embodiments of the present invention can use only two iterations of linear programming. First, solve the maximum concurrent flow for λ, and then solve a maximum throughput flow subject to the constraint that every commodity receive at least the throughput λ.

$$\max \sum_k f_k$$

$$w_k \lambda \leq f_k \forall k$$

This is called the max-fair formulation. The simulations in Section IV below show that the max-fair formulation significantly improves network utilization.

When the network environment 100 includes wireless links, link interference can cause one pair of communicating nodes to prevent another pair from communicating. In this case, the liner programming model can be modified to account for possible interference. By formulating link interference as a set of linear constraints, the present model is extended to multi-hop wireless networks. The constraints look like the following, where S indexes maximal sets of non-interfering links.

$$u_s \geq 0 \forall S$$

$$\sum_s u_s \leq 1$$

$$\sum_k (x_{i,j,k} + x_{j,i,k}) \leq c_{i,j} \sum_{S:(i,j) \in S} u_S \forall (i, j) \in E$$

As discussed above in relation to step 806 of FIG. 8a, a host node can specify its demands in absolute rates (as in the inter-node communications information 500 of FIG. 5), but the control unit 200 can normalize these demands into percentages of the host node's total demand. These normalized demands are the model's weights Wk. Normalization leads to weights that achieve node-demand fairness; every host node has the same total aggregate demand split across any number of communication flows. Of course, if a host node reports no demands, then the control unit 200 reserves no bandwidth for it.

By normalizing demand, the present model easily accommodates preferential treatment. If the importance of the data flows of host 102 is to be doubled, then the model simply normalize host 102's demand to 200% while the demands of the other nodes continue to be normalized to 100%. Section IV below shows that this tuning allows the present model to achieve relative differentiated services.

While the computation involved in the above linear programming model grows with the size of the network modeled, even a very large network can be reasonably modeled by treating that network as a hierarchy of smaller networks. In the case of ISP peering mentioned above, a hierarchical simplification is appropriate because the aggregate inter-ISP traffic changes only on a long time scale even when the constituent flows come and go rapidly. In the scenario of a neighborhood network behind a gateway, the model can be simplified by only modeling the data flows that pass through the gateway.

The simplifications involved in treating a network hierarchically leave open the issue of how to handle traffic at levels of the hierarchy below the notice of the model. One way to address this is with a hybrid approach. In the simple, monolithic approach, the node-demand fair model optimizes bandwidth utilization only for the nodes' specified demands. When the network becomes fully loaded, any traffic surges not specified in the demand distribution are dropped. Of course, any traffic at levels of the hierarchy below the model's notice are included in this non-specified demand and thus are subject to being dropped. Simply recalculating the demand distribution is not an acceptable solution because that could introduce unacceptable latency, especially when the demand surges are short lived. To address these surges, the hybrid approach applies the node-demand fair model to only a portion of the total network capacity. The remaining portion is reserved for surges. The routers use traditional, best-effort routing when they need to call upon this bandwidth reserve during a demand surge.

The hybrid approach is more generally applicable than this particular scenario suggests. The hybrid approach is useful whenever the results of applying the above model to these "small" flows are not worth the computational costs of including the small flows in the routing and bandwidth allocation calculations. For example, many network environments 100 can afford to reserve enough bandwidth to adequately supply these small flows, and thus the guarantees provided by including the small flows in the above calculations would add little to the quality of communications in these environments. Results of simulating the hybrid approach are presented below in Section IV.

The routing and bandwidth allocation tables produced by the node-demand fair mechanism have the desirable property that it is in each individual node's best interest to send their packets along the path suggested by those tables. This simply follows from the fact that the max-fair mechanism saturates every link. Any fractional demand that the mechanism suggests sending from s to d along path p will encounter more congestion along any other path.

Figure 14A:
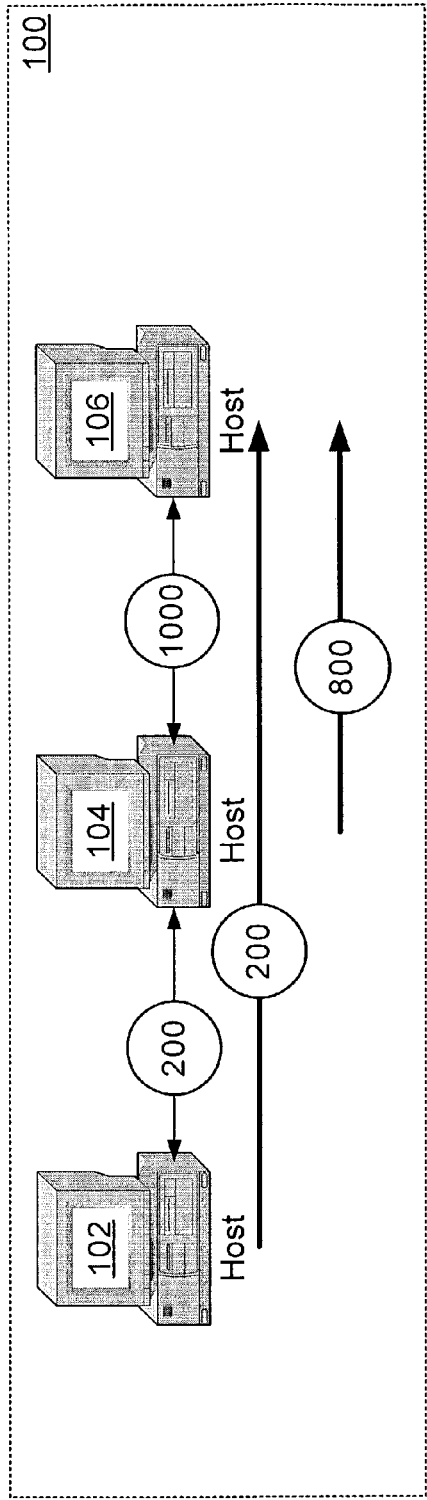
FIG. 14a is a flow rate diagram of an exemplary communications environment wherein the host network nodes report their true demands.
Figure 14B:
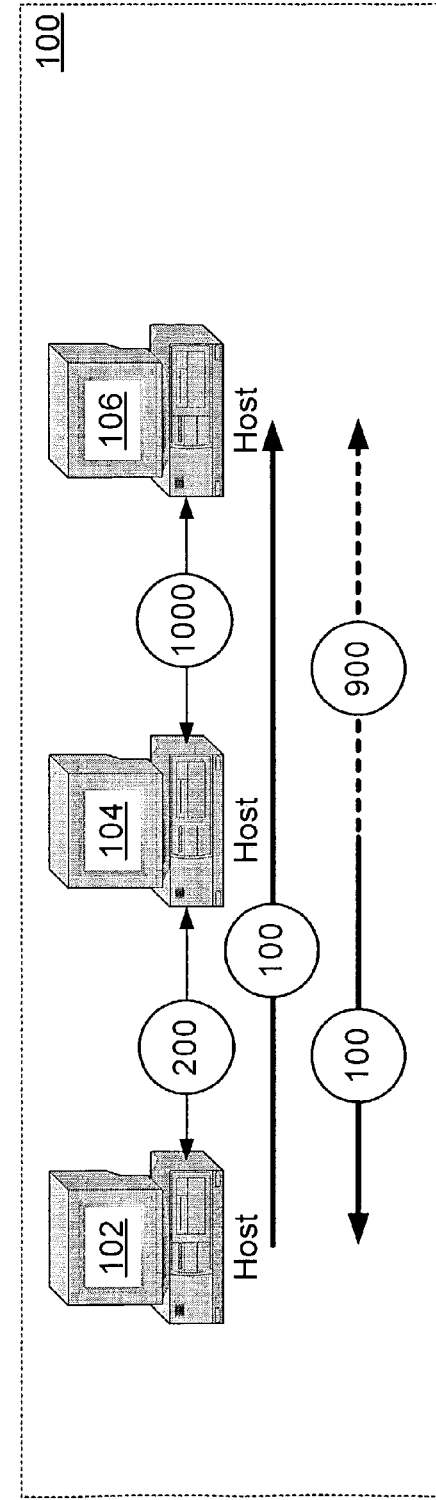
FIG. 14b is a flow rate diagram of the same environment where one host network node misrepresents its demand.

Unfortunately, in certain topologies a node can increase its bandwidth allocation by misrepresenting its true demands. An example of this is illustrated in FIGS. 14a and 14b. Suppose that the hosts 102 and 104 desire to communicate with the host 106 and that the respective link capacities are 200 and 1000 Kbps. If hosts 102 and 104 both report their demands honestly, then the max-min fair routing (which in this case is also the max-fair routing) is as shown in FIG. 14a. Unfortunately, if the host 104 were to report its demand only for the host 102, then the bandwidth allocation would be as shown in FIG. 14b. Here, the host 104 is given an additional 100 Kbps of bandwidth to the host 106. This misrepresentation problem does not occur in the gateway scenario mentioned above because there each node has only one demand, but misrepresentation can be a source of concern in more general settings.

To address this problem of misrepresentation, the control unit 200 replaces the reported $w_{s,d}$ (the demand from s to d) by $\min\{w_{s,d}, w_{d,s}\}$. This change makes the effective demand specification symmetric, rationing bandwidth both to senders and to receivers. This refinement offers protection against some Denial of Service attacks, like the one just considered.

The linear programming model developed above can result in a large number of variables: n(n−1)m for an network with n nodes and m edges. A more compact formulation improves the scalability of the node-demand fair mechanism. The compact formulation lumps all commodities with a common destination into a single commodity with multiple sources. Although the variables are different, the result is the same. The compact formulation reduces the maximum number of variables to nm. This compact formulation is used in the simulations reported below in Section IV.

The variables for the compact formulation are shown below in Table 3. The Table is followed by the compact version of the max-fair linear program. The compact formulation does not readily allow for dispersion constraints because flows along an edge sharing a common destination are now indistinguishable.

TABLE 3

Scalable Multi-Commodity Flow Variables

| Variable: | Definition: |
| --- | --- |
| $f_{s,d}$ | the net flow from s to d |
| $y_{i,j,d}$ | the amount of "destination d" flow routed from i to j |

(first) max λ

(second) max $\sum_{s \neq d} f_{s,d}$ $w_{s,d} \lambda \leq f_{s,d} \forall s, d \in V, s \neq d$ $y_{i,j,d} \geq 0 \forall d \in V, \forall (i, j) \in E$ $\sum_d (y_{i,j,d} + y_{j,i,d}) \leq c_{i,j} \forall (i, j) \in E$ $\sum_{j:(s,j) \in E} (y_{s,j,d} - y_{j,s,d}) = f_{s,d} \forall s, d \in V, s \neq d$ $f_{s,d} \geq 0 \forall s, d \in V, s \neq d$ Section IV: Results of Simulations This Section presents the results of simulating two varieties of the node-demand fair mechanism. The first variety uses the fair objective function (maximum concurrent flow), while the second variety uses the max-fair objective function. The simulated network environment consists of a two dimensional grid of up to 196 nodes and with all link capacities set to 1. The goal of the simulations is to understand how the node-demand fair mechanism affects network throughput, fairness in bandwidth sharing, and efficiency in multipath routing. The simulations also explore how node-demand fairness can provide differentiated services. Both varieties of the mode-demand fair mechanism are compared to the traditional single, shortest path routing as currently used in the Internet.

In this Section, the aggregate traffic between a pair of nodes is called a "flow." Network throughput is defined to be the sum of all flow throughputs. This represents the objective function of maximum throughput flow.

Figure 15:
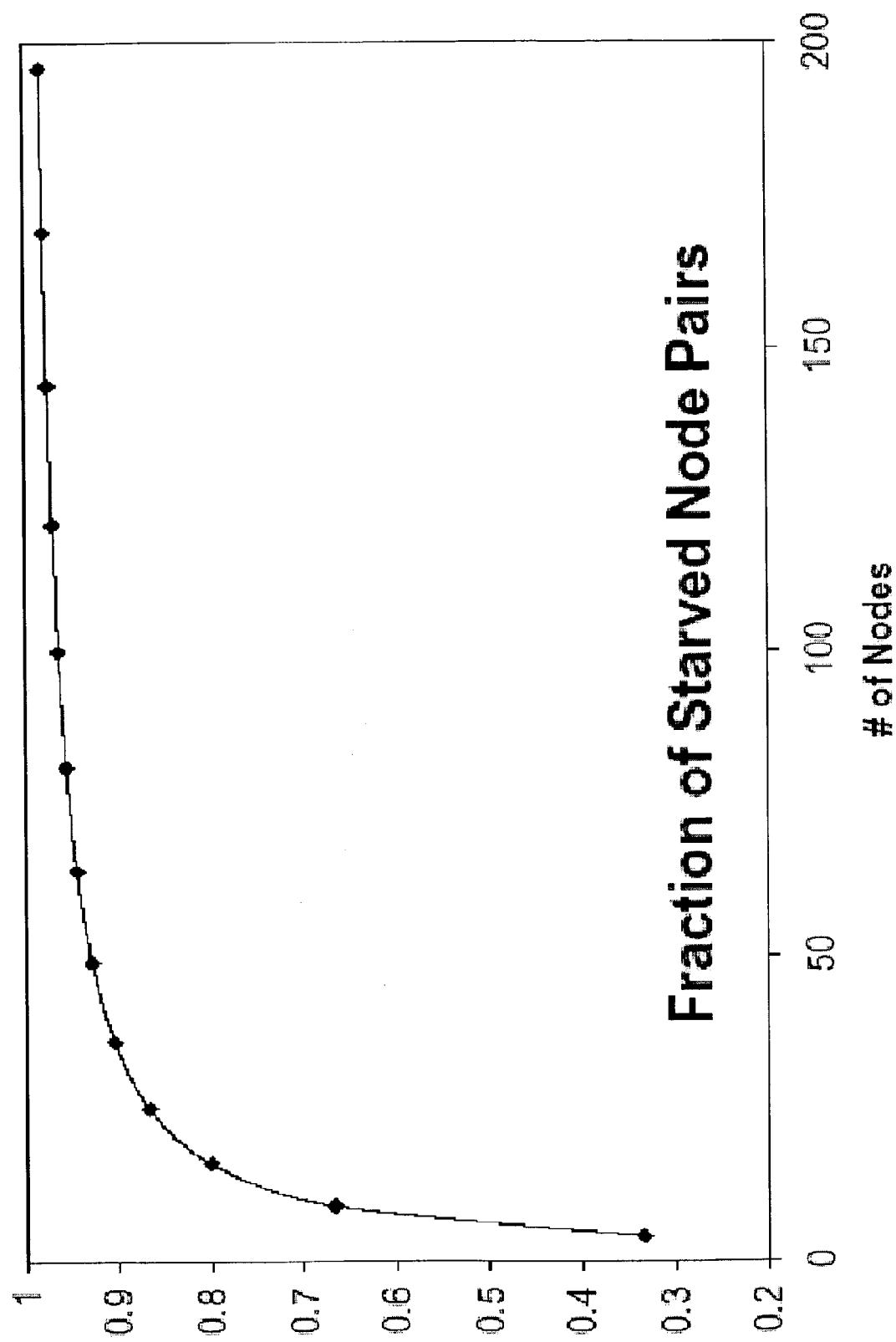
FIG. 15 is a plot charting bandwidth starvation of node pairs caused by a bandwidth allocation policy that achieves the maximum possible throughput.

Of course, the sum of all link capacities forms an upper bound on the possible throughput. A communication pattern that actually achieves this upper bound is undesirable because it starves a large percentage of the node pairs, as shown in FIG. 15.

Wasting link capacity is an obvious, and clearly undesirable, cause of low throughput. Another cause of low throughput is the allocation of bandwidth to flows that traverse long paths. A flow with a long path requires capacity from more links for the same end-to-end throughput than does a flow with a short path. When a long-path flow shares links with a series of short-path flows, increasing the amount of bandwidth allocated to the long-path flow decreases the available bandwidth for all of the short-path flows. While this yields a lower overall throughput, this result is not necessarily undesirable as it involves a legitimate policy tradeoff between the long-path and short-path flows.

Figure 16:
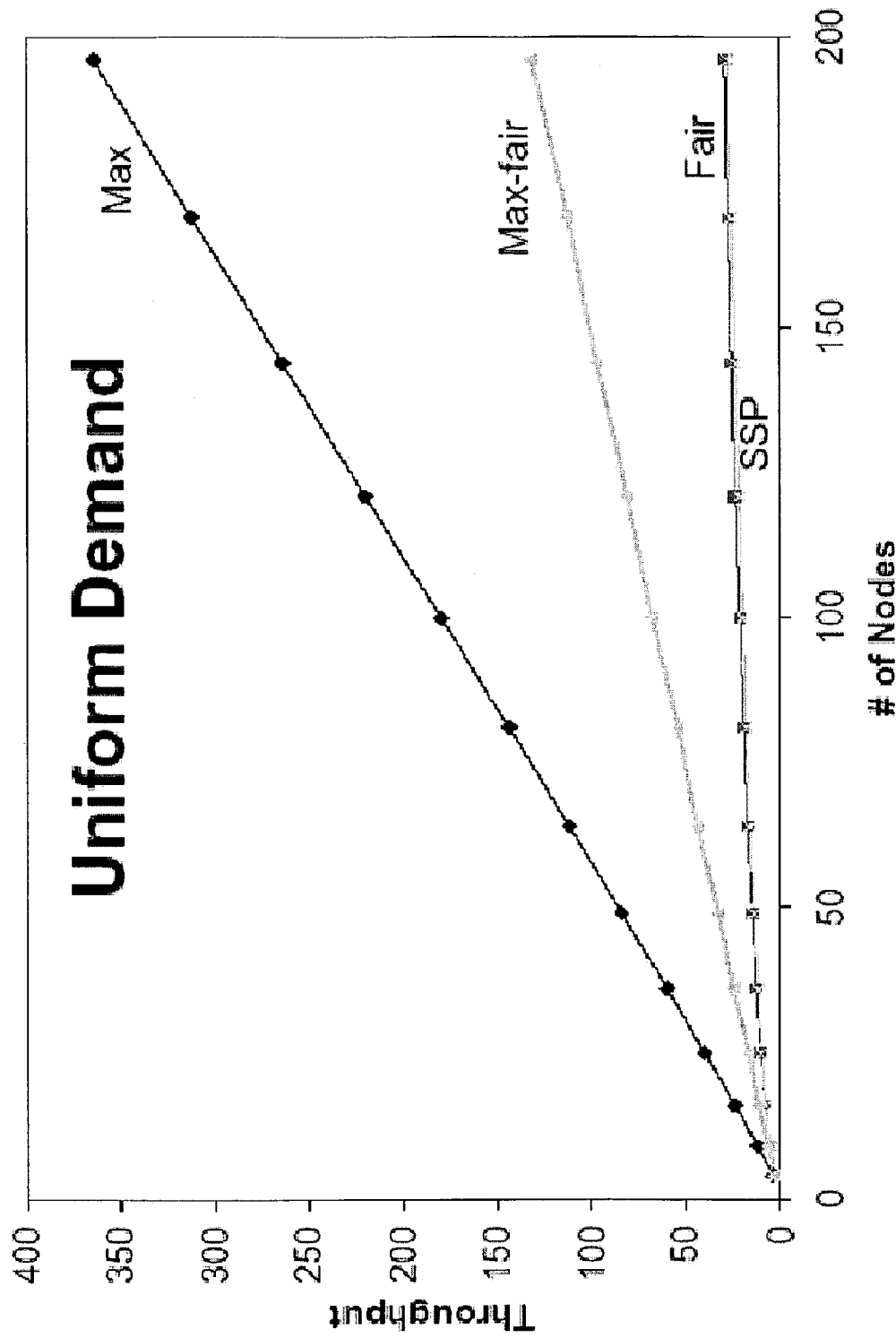
FIG. 16 is a plot charting throughputs achieved by various bandwidth allocation policies.

For the special case of uniformly distributed inter-node demands, FIG. 16 shows the maximum possible throughput, the max-fair throughput, the fair throughput, and the single, shortest path (SSP) throughput. Where there are more than one shortest path, the simulation randomly chooses one. For SSP, each router applies an unbiased local, per-flow bandwidth sharing policy. It is not surprising that this fair allocation does not fully utilize the network capacity. From the above discussion of the tradeoff between long-path flows and short-path flows, it can be seen that the gap between the max and the max-fair throughputs is due to the aggressive provisioning of short-path flows by the max allocation.

Figure 17:
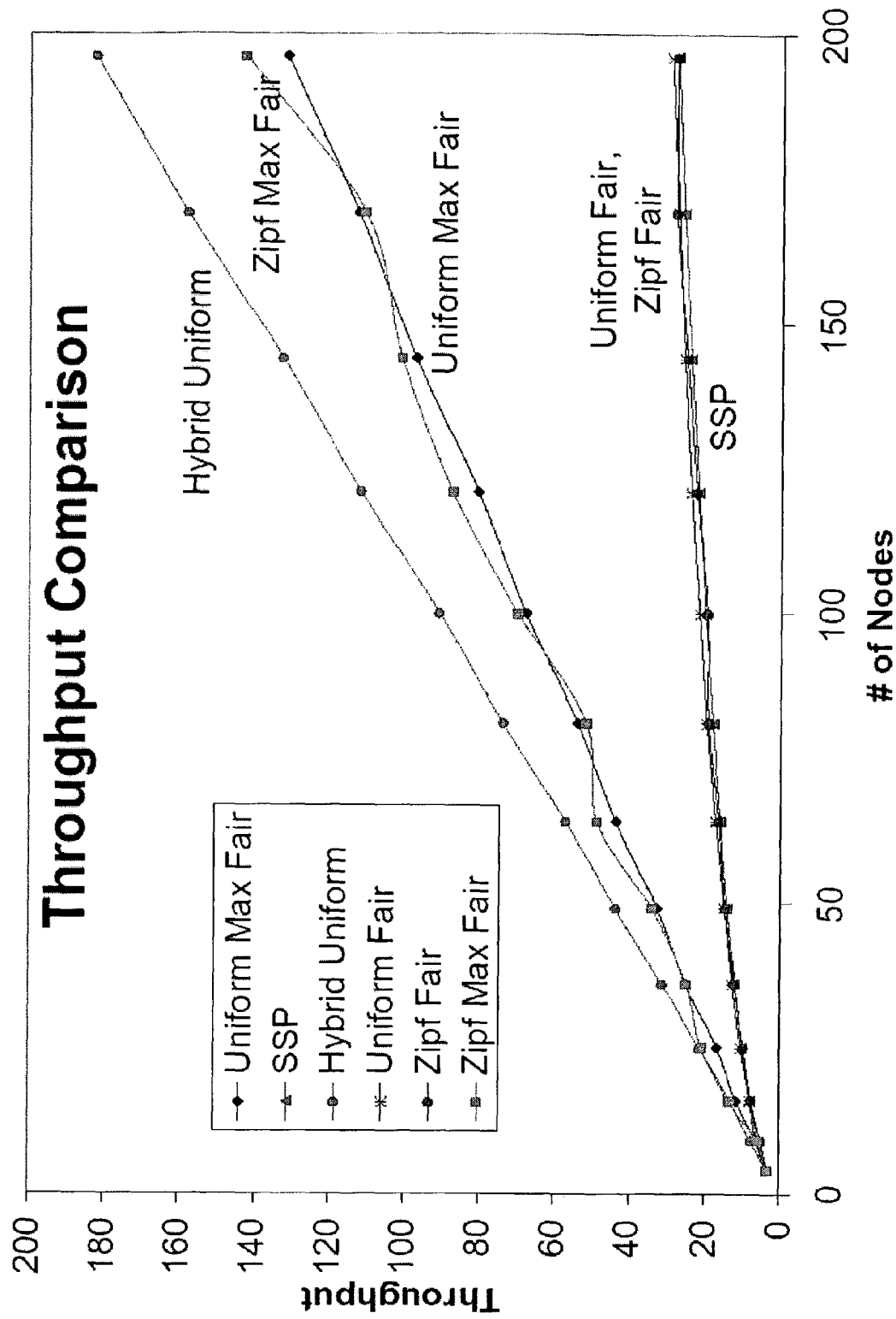
FIG. 17 is a plot charting throughput as a function of the distribution of demand.

FIG. 17 shows the effects on throughput of varying the demand distribution. Both a uniform distribution and a slope −2 Zipf distribution of node-pair demands are simulated. (For comparison, the distribution of site visits from AOL users is a Zipf distribution with a slope of −2.07.) Also simulated is the hybrid mode with half of the available bandwidth allocated by the node-demand fair mechanism and the other half of the bandwidth held in reserve to be allocated using SSP with uniform demands.

FIG. 17 shows that the Zipf results are very similar to the uniform results for both the fair and the max-fair mechanisms. The Zipf and uniform fair throughputs are both slightly better than the SSP throughput. The hybrid case yields the best throughput, but this is a consequence of its demand distribution (which is neither Zipf nor uniform). For the gateway scenario discussed above, the hybrid, max-fair case allocates less than half of the bandwidth to the gateway links. The gateway links are quickly saturated, and the remaining bandwidth is devoted to short flows that yield a high throughput.

Figure 18:
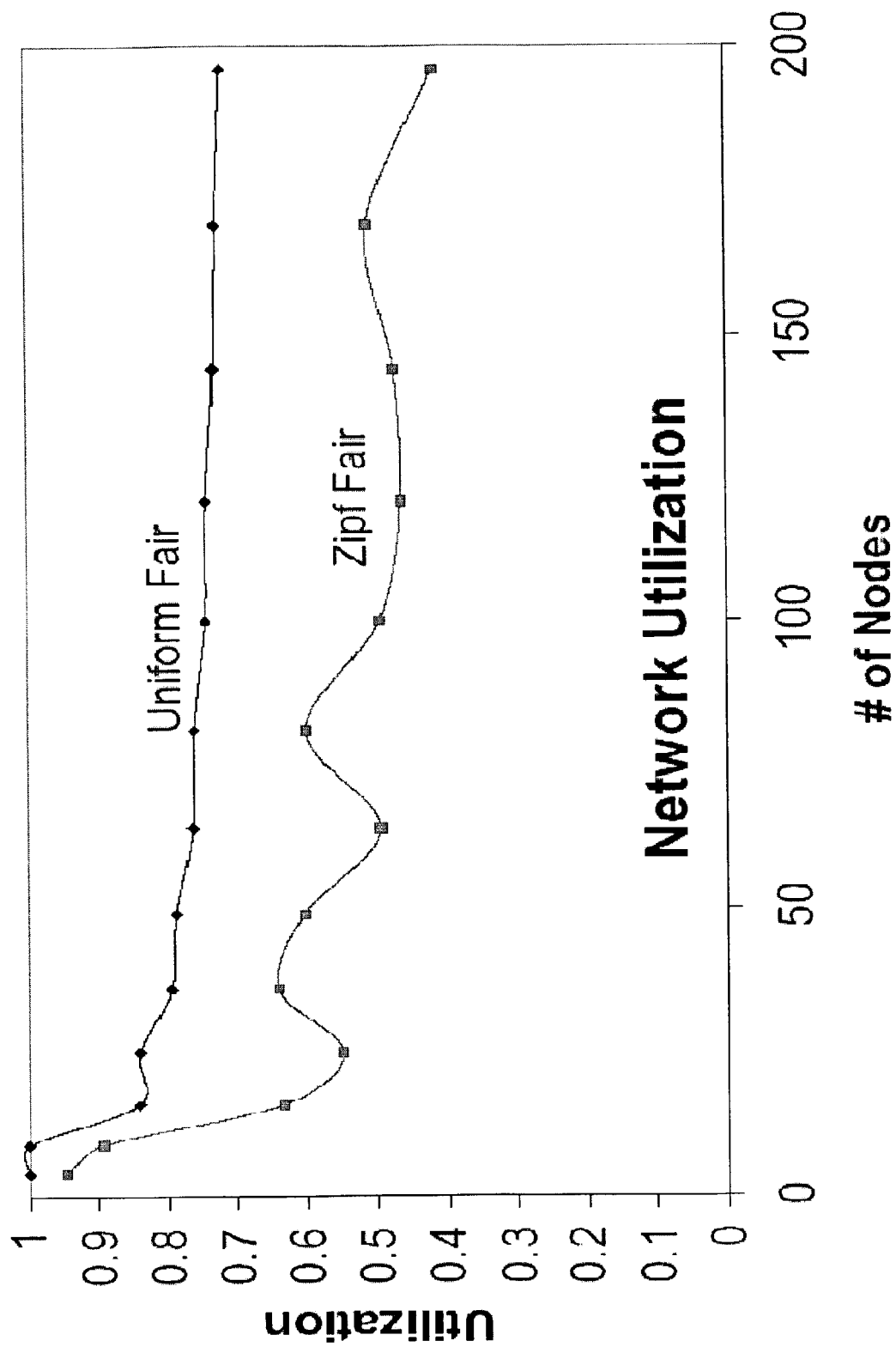
FIG. 18 is plot charting utilization of available bandwidth as a function of the distribution of demand.

FIG. 18 plots the effect on network utilization of varying the demand distribution. It may be that the heavy-tailed property of the Zipf demand distribution yields a very uneven distribution in specified destinations, resulting in bottlenecks around the most popular destinations and thereby lowering the overall utilization.

Figure 19A:
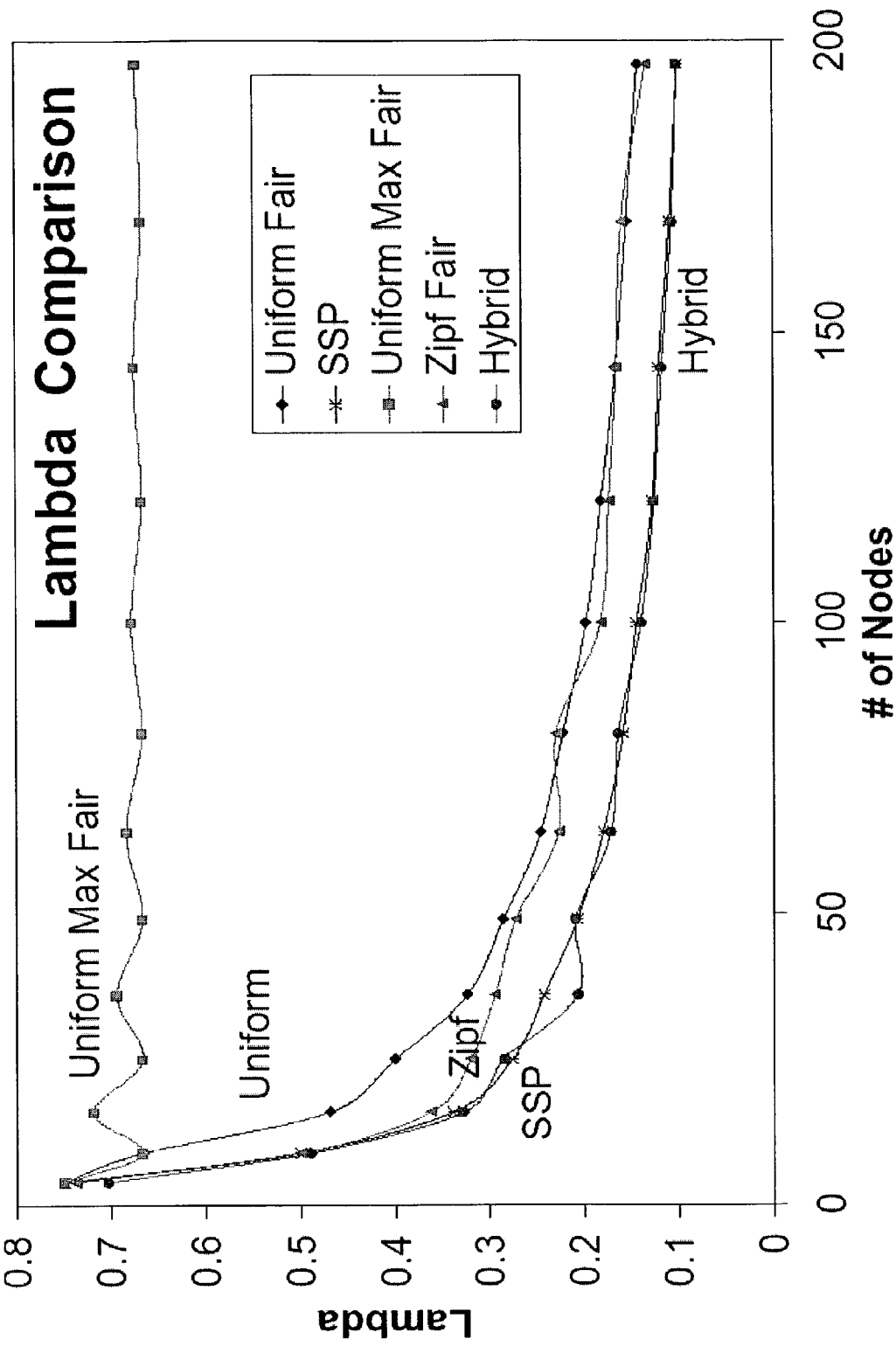
FIG. 19a is plot charting bandwidth demand satisfaction under various conditions and policies.
Figure 19B:
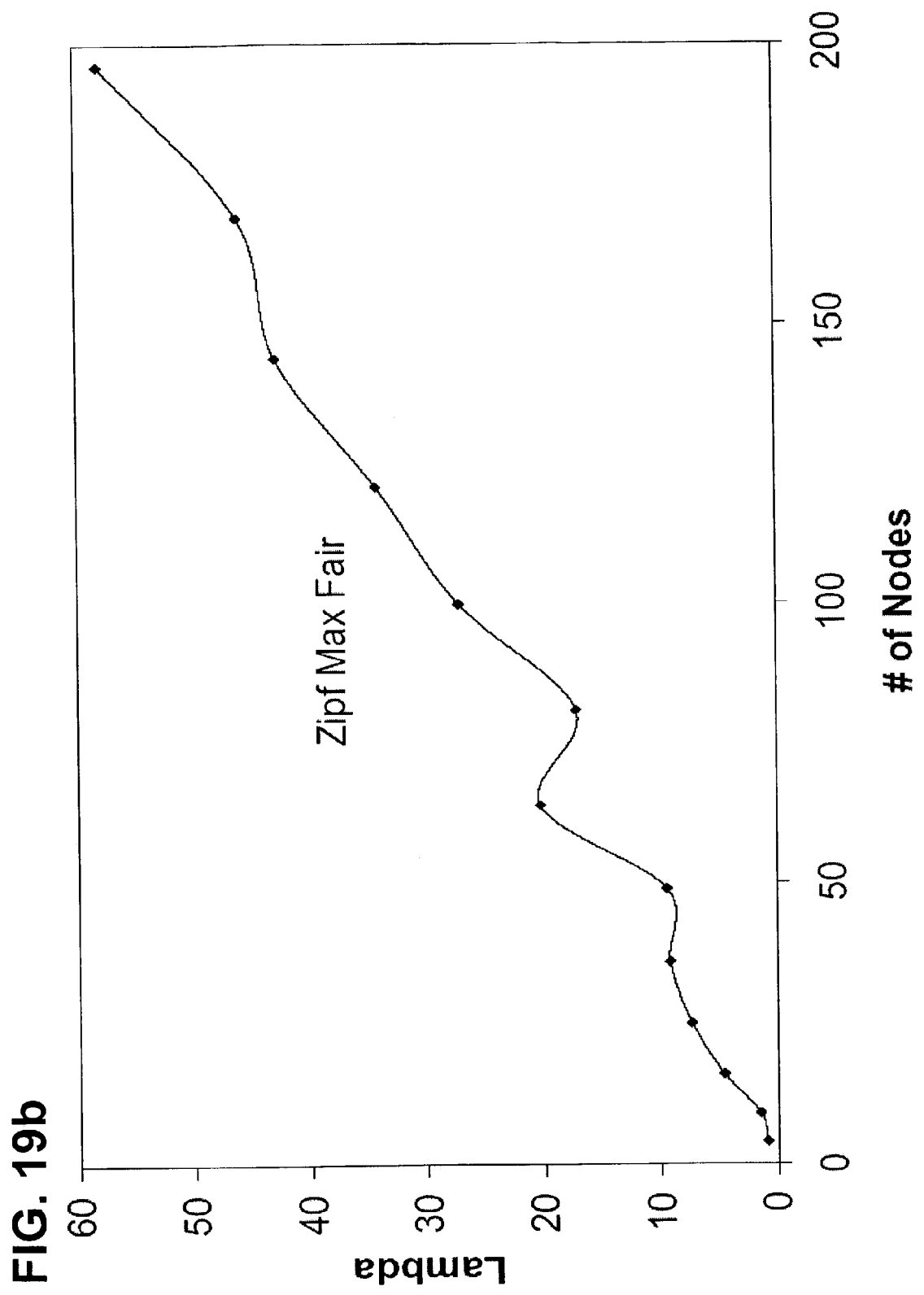

When evaluating routing and bandwidth allocation policies, the throughput achieved is only one relevant criterion. Higher throughput is not necessarily good if it comes at the cost of lowered demand satisfaction. In the above model, $\lambda$ is precisely an indicator of demand satisfaction. FIGS. 19a and 19b compare the $\lambda$ achieved under various settings. The average flow divided by the demand (the average $\lambda$) are plotted for max-fair and for SSP. The hybrid results show a low level of demand satisfaction because the hybrid demand distribution focuses on a single gateway. The uniform fair mechanism improves demand satisfaction over SSP by 38% on average, and Zipf fair improves over SSP by 25% on average. It is not surprising that the max-fair mechanism improves the average $\lambda$ manyfold. Under a uniform demand distribution, average $\lambda$ is exactly proportional to throughput. Under Zipf demands (as shown in FIG. 19b), the max-fair allocated bandwidth overprovisions many small demands significantly, yielding a very large average $\lambda$.

Figure 20A:
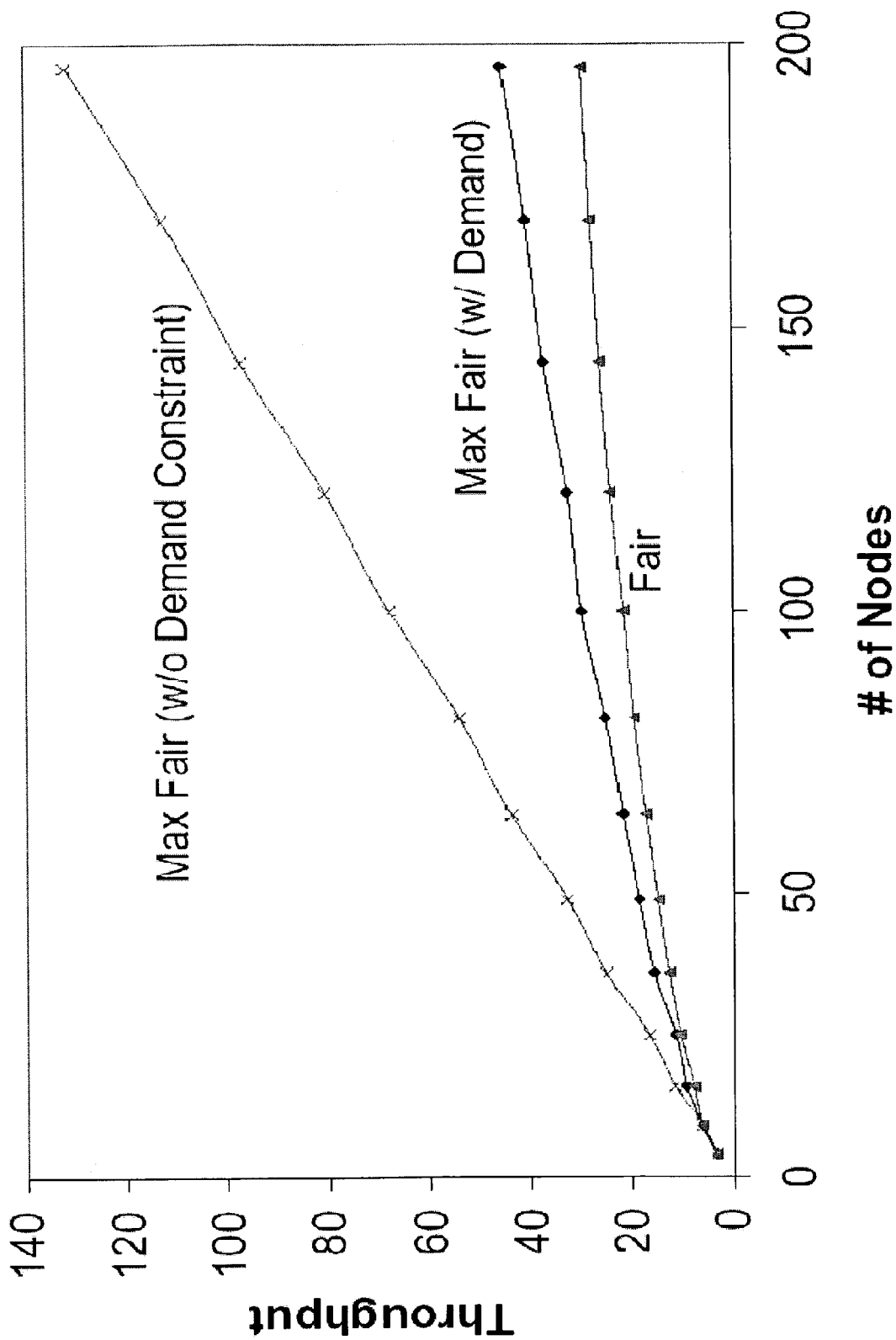
FIG. 20a is a plot charting throughput achieved by a max-fair bandwidth allocation policy with and without a constraint that no normalized node demand is oversupplied.
Figure 20B:
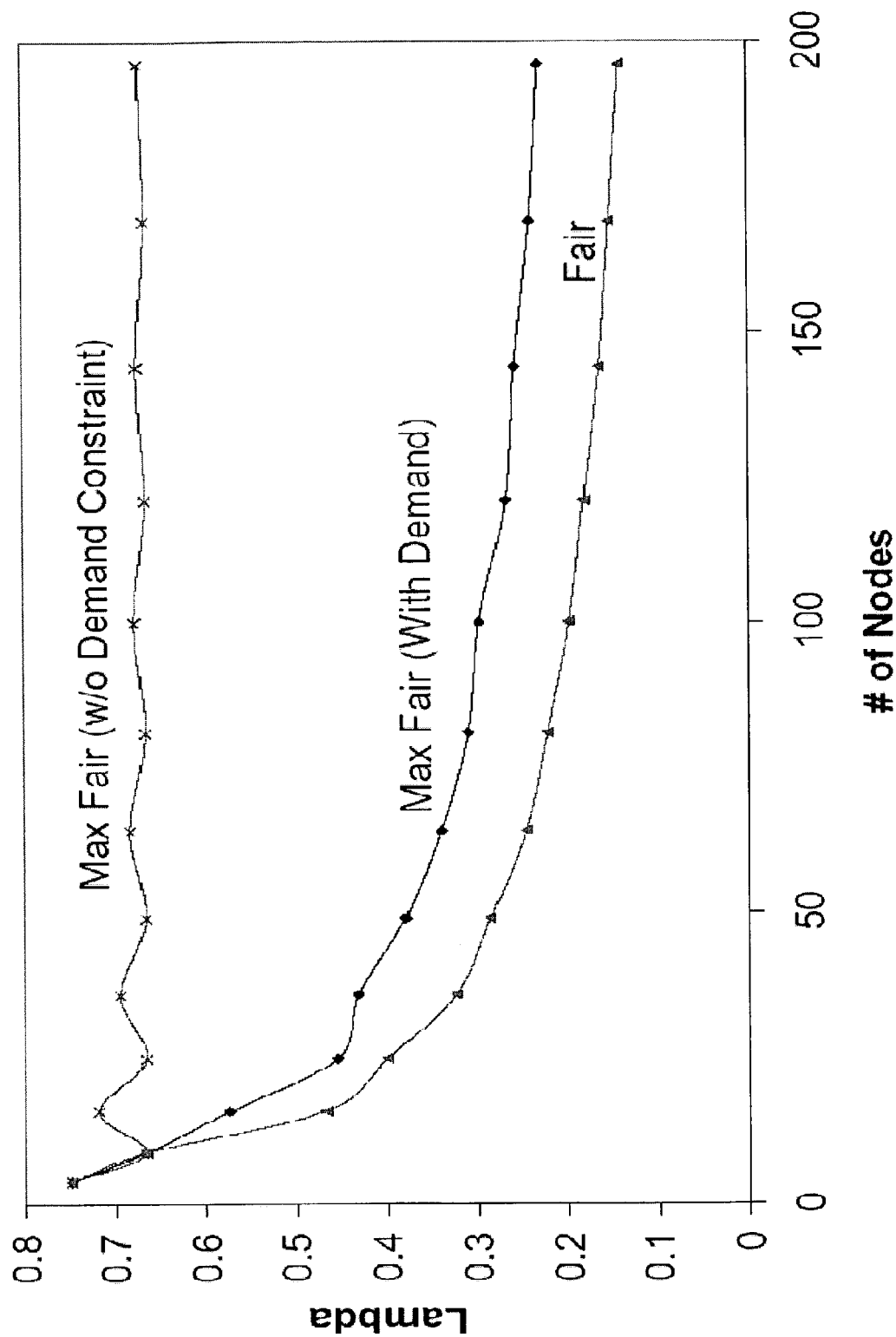
FIG. 20b is a plot charting bandwidth demand satisfaction with and without the same constraint.

The max-fair scheme does not perfectly implement max-min fairness. The extent to which unfairness occurs after solving the initial maximum concurrent flow was simulated both with and without the added constraints that no normalized node demand was oversupplied: $f_k \leq w_k \forall k$. The results for throughput and for average $\lambda$ are shown in FIGS. 20a and 20b, respectively. The surprising result is that the max-fair throughput subject to these oversupply constraints decreases almost to the level of the fair throughput. Thus, the oversupply constraints alone are enough to eliminate much of the bias towards short paths that occurs when maximizing the throughput. The average $\lambda$ plot of FIG. 20b presents a different view of the same data because the average $\lambda$ times the number of nodes equals the throughput for uniformly distributed demands. In FIG. 20b, the oversupply constraints yield a growth rate in the max-fair formulation that more closely tracks the growth in the fair formulation. This is further evidence that the oversupply constraints suffice to remove short-path bias.

Shortest single path routing minimizes the latency experienced by any packet according to the link metrics. The multi-commodity flow formulation does not include any upper bound on the length of a path. Intuitively, it is expected that the length of each multipath is close to the length of the corresponding shortest path, because if the multipath uses many unnecessary links, it would decrease the bandwidth available to other flows and would probably lead to a globally suboptimal bandwidth allocation. This is a short-path bias under a different objective function than that of maximizing throughput.

The average path length experienced by a packet during multipath routing is defined using the variables $\{x_{i,j,s,d}\}$ for the flow from i to j with source s and destination d. Let $f_{s,d}$ denote the total flow from source s to destination d. The average path length from s to d is then $$\frac{1}{f_{s,d}} \sum_{(i,j)} x_{i,j,s,d}.$$

Dividing by the distance from s to d gives the stretch of the multipath, that is, the factor by which it is longer than the shortest single path. In simulations on grids of up to 25 nodes using a uniform demand distribution assumption, the stretch is always 1: The multipath routing did not incur any additional latency, which confirms the intuition about short-path bias.

Section III above discusses the addition of dispersion constraints. The simulation results presented in this Section IV are not based on these dispersion constraints, but the multipaths are quite dispersed anyway. To measure the dispersion of a multipath, define the average dispersion metric. Let $$\text{Var}_{s,d} = \frac{1}{f_{s,d}^2} \sum_{(i,j)} x_{i,j,s,d}^2$$

be the variance of the flow between s and d. Then, let the average dispersion from s to d be the distance between s and d divided by $\text{Var}_{s,d}$. To give some intuition for this definition, suppose that the multipath simply routed a fraction 1/k of the traffic along each of k disjoint shortest paths. Then the average dispersion would simply be k.

Figure 21:
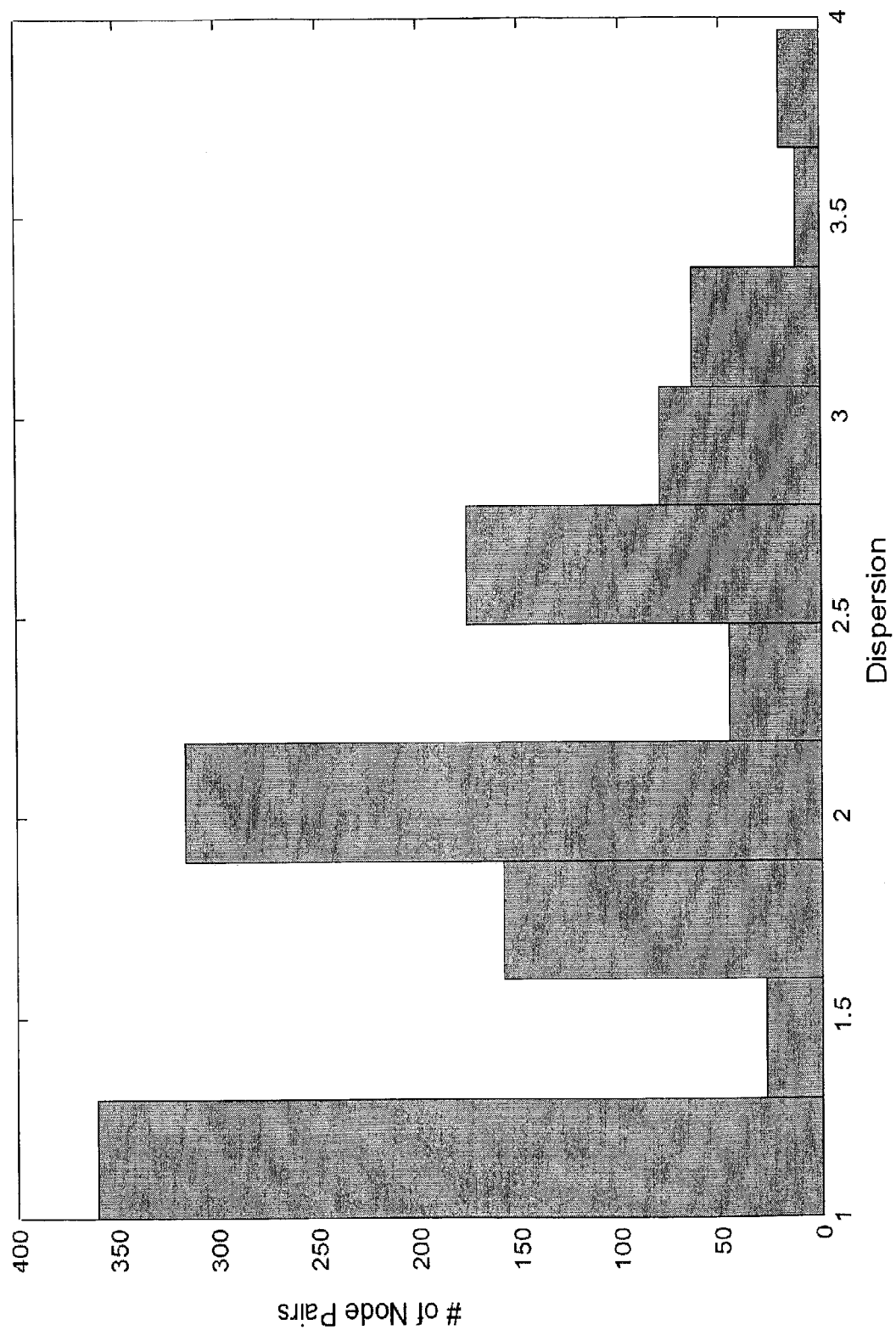
FIG. 21 is a bar chart of a distribution of an average multipath dispersion achievable by methods of the present invention for flows with uniform demands.

FIG. 21 plots the distribution of the average dispersion metric for the flows on a 6 by 6 grid topology with uniform demands. More than half the flows experience an average dispersion greater than 2. This suggests that many of the flows would continue to experience significant throughput even if some link along that flow's multipath failed.

Figure 22A:
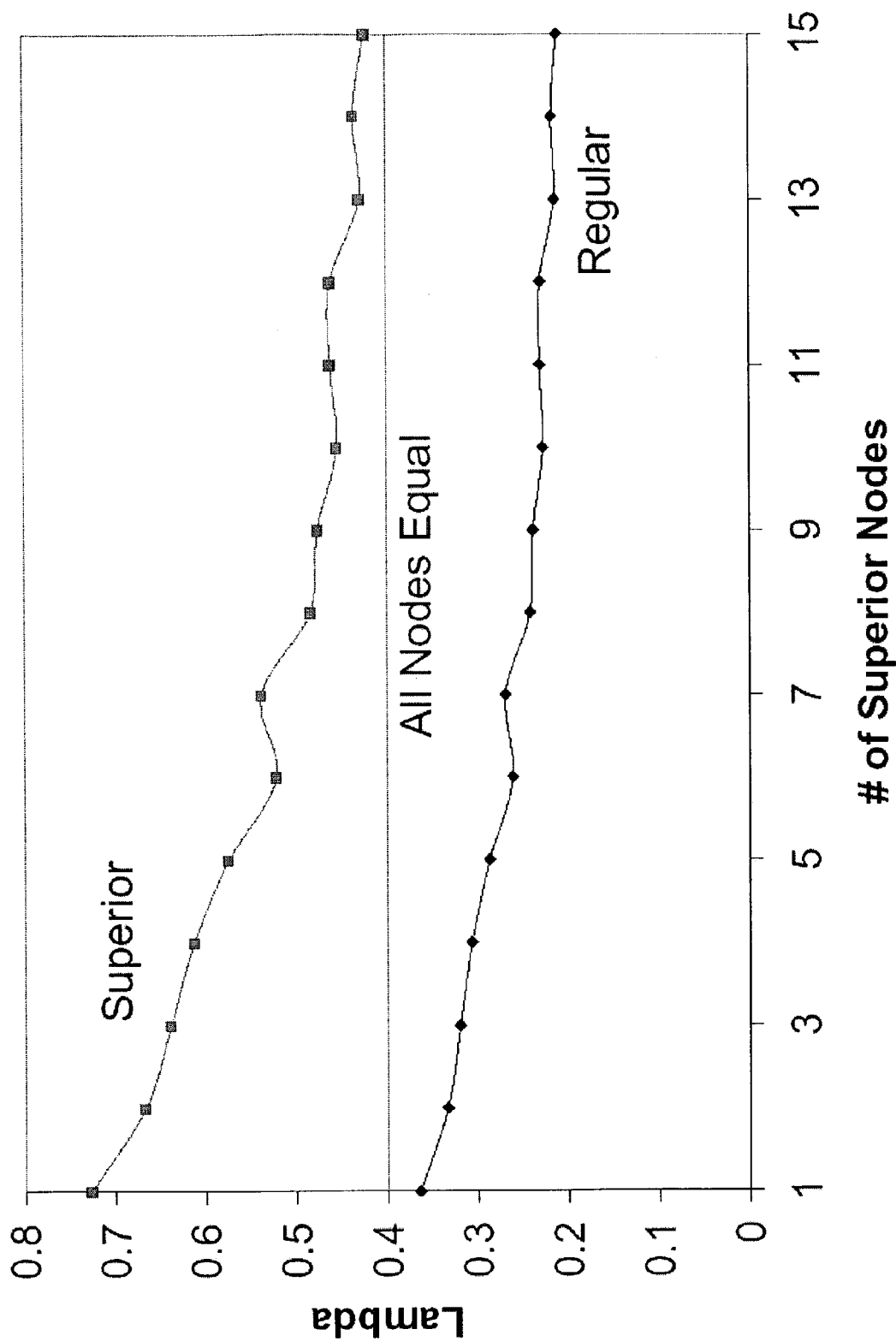
FIG. 22a is a plot charting bandwidth demand satisfaction when satisfying the demand of some nodes is deemed to be twice as important as satisfying the demand of other nodes.
Figure 22B:
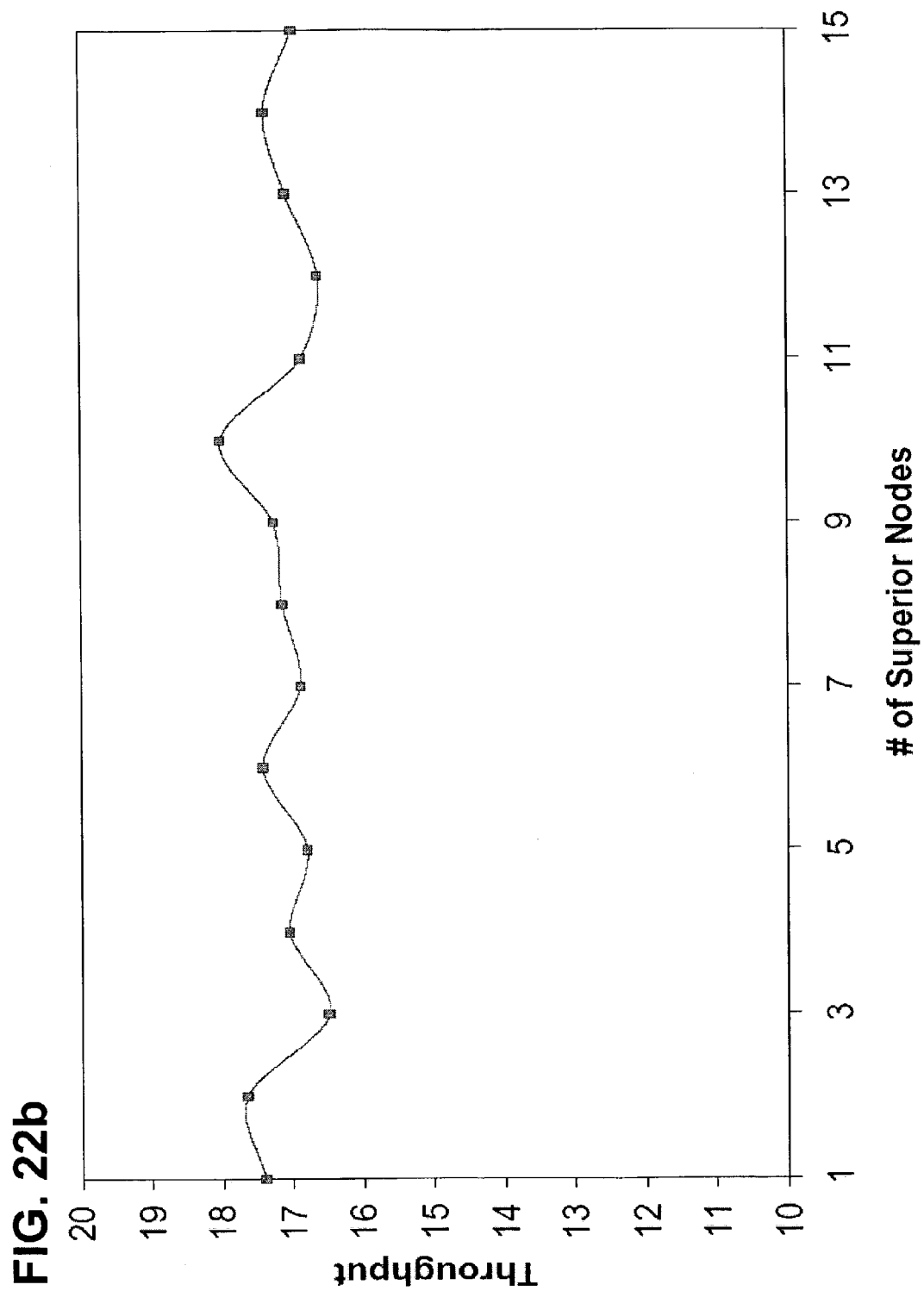
FIG. 22b is a plot charting throughput under the same conditions.

Service among end hosts can be differentiated through their demand specifications. For purposes of simulation, a node in the middle of a 25-node grid topology is chosen to be a superior node whose demand is deemed twice as important as that of other nodes. The demand for communications to and from this superior node is doubled accordingly. The simulation shows that the λ for regular nodes decreases slightly from 0.40 to 0.36, while the λ for the superior node increases from 0.40 to 0.72, an increase of a factor of 1.8. This is exactly the desired result: The superior node receives twice as much bandwidth as the regular nodes, reflecting the demand specification exactly. Furthermore, the bandwidth of the regular nodes degrades only slightly to accommodate the superior node. Simulations with increasing numbers of superior nodes show how this degrades the regular nodes' bandwidth and the overall network throughput. FIGS. 22a and 22b show that as the number of superior nodes increases, the demand satisfaction level for both superior and regular nodes degrades only gradually, and the superior nodes always receive twice as much bandwidth as the regular nodes. Thus, the methods of the present invention can support differentiated services by simply varying the demand distributions.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be extended to cover hierarchical and mixed architecture networks without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

We claim:

1. In a network communications environment comprising a plurality of network nodes, a plurality of communications links among network nodes, and a control unit, the plurality of network nodes comprising a plurality of host network nodes and a plurality of router network nodes, a method for the control unit to produce routing information, the method comprising:
   receiving topology information about the network communications environment;
   receiving inter-node communications information;
   computing routing information for at least one router network node, the computing based, at least in part, on the received topology information and on the received inter-node communications information, wherein computing routing information comprises applying a max-fair algorithm to the received topology information and to the received inter-node communications information using a multi-commodity flow implementation, wherein applying the max-fair algorithm comprises first satisfying demand in a fair manner and then satisfying remaining demand by maximizing a sum of allocated flow rates;
   computing, at the control unit, bandwidth allocation information for at least one router network node, the computing based, at least in part, on the received topology information and on the received inter-node communications information, wherein computing bandwidth allocation information comprises applying the max-fair algorithm to the received topology information and to the received inter-node communications information using the multi-commodity flow implementation; and
   sending the bandwidth allocation information to the at least one router network node.

2. The method of claim 1 wherein the network communications environment comprises a virtual private network and further comprises a communications link to the Internet.

3. The method of claim 1 wherein the network communications environment comprises a neighborhood network and further comprises a communications link to the Internet.

4. The method of claim 1 wherein the network communications environment is a hierarchical communications environment and wherein at least one of the plurality of communications links comprises a virtual communications link among network nodes, the virtual communications link comprising a plurality of physical communications links.

5. The method of claim 4 wherein the network communications environment comprises an Internet Service Provider peering environment.

6. The method of claim 1 wherein at least one of the plurality of communications links is selected from the group consisting of: a point-to-point link, a broadcast link, a wired link, a wireless link, an electrical link, an optical fiber link, an infrared link, and a radio link.

7. The method of claim 1 wherein at least one of the plurality of communications links is selected from the group consisting of: a virtual communications link comprising a plurality of physical communications links and a multi-hop communications link comprising a plurality of single-hop communications links.

8. The method of claim 1 wherein the control unit is one of the plurality of network nodes.

9. The method of claim 1 wherein at least one of the plurality of network nodes is both a host network node and a router network node.

10. The method of claim 1 wherein receiving topology information comprises receiving topology information from at least one router network node.

11. The method of claim 10 wherein receiving topology information comprises receiving information selected from the group consisting of a capacity of at least one communications link connected to the router network node and an identification of at least one other network node connected to a communications link connected to the router network node.

12. The method of claim 1 wherein receiving inter-node communications information comprises receiving inter-node communications information from at least one host network node.

13. The method of claim 1 wherein computing routing information comprises constructing a map of the network communications environment from the received topology information.

14. The method of claim 1 wherein computing routing information comprises normalizing the received inter-node communications information.

15. The method of claim 1 wherein receiving inter-node communications information comprises receiving a pair of data flow demands, a first member of the pair being a data flow demand from a first network node to a second network node, and a second member of the pair being a data flow demand from the second network node to the first network node, and wherein computing routing information comprises using only the smaller data flow demand of the pair.

16. The method of claim 1 wherein the plurality of communications links comprises a plurality of wireless links, wherein flow on a first wireless communications link interferes with flow on a second wireless communications link, and wherein computing routing information comprises constraining an allocated flow on the second wireless communications link to account for the interference.

17. The method of claim 1 wherein computing routing information comprises constraining a fraction of an allocated flow rate routed across one communications link.

18. The method of claim 1 wherein computing routing information comprises constraining a fraction of an allocated flow rate routed through one router network node.

19. The method of claim 1 wherein applying a max-fair algorithm comprises computing an expected flow rate for a pair of network nodes.

20. The method of claim 19 wherein applying a max-fair algorithm comprises maximizing a sum of allocated flow rates within the network communications environment subject to a constraint of maximizing a minimum of ratios of allocated flow rates to expected flow rates.

21. The method of claim 1 wherein computing routing information for at least one router network node comprises computing routing information for the control unit.

22. The method of claim 1 wherein computing routing information for at least one router network node comprises computing routing information for a router network node distinct from the control unit, the method further comprising:
sending the computed routing information to the router network node.

23. The method of claim 1 further comprising:
receiving updated topology information about the network communications environment;
receiving updated inter-node communications information; and
computing updated routing information for at least one router network node, the computing based, at least in part, on the received updated topology information and on the received updated inter-node communications information.

24. The method of claim 23 wherein receiving updated topology information, receiving updated inter-node communications information, and computing updated routing information are performed periodically.

25. The method of claim 23 wherein computing updated routing information comprises removing from consideration a network node that does not provide updated information.

26. The method of claim 1 wherein computing bandwidth allocation information comprises constructing a map of the network communications environment from the received topology information.

27. The method of claim 1 wherein computing bandwidth allocation information comprises normalizing the received inter-node communications information.

28. The method of claim 1 wherein receiving inter-node communications information comprises receiving a pair of data flow demands, a first member of the pair being a data flow demand from a first network node to a second network node, and a second member of the pair being a data flow demand from the second network node to the first network node, and wherein computing bandwidth allocation information comprises using only the smaller data flow demand of the pair.

29. The method of claim 1 wherein applying a max-fair algorithm comprises computing data flow demand for a pair of network nodes.

30. The method of claim 29 wherein applying a max-fair algorithm comprises maximizing a sum of allocated flow rates within the network communications environment subject to a constraint of maximizing a minimum of ratios of allocated flow rates to data flow demands.

31. The method of claim 1 wherein computing bandwidth allocation information for at least one router network node comprises computing bandwidth allocation information for the control unit.

32. The method of claim 1 wherein computing bandwidth allocation information for at least one router network node comprises computing bandwidth allocation information for a router network node distinct from the control unit, the method further comprising:
sending the computed bandwidth allocation information to the router network node.

33. The method of claim 1 wherein computing bandwidth allocation information for at least one router network node comprises, for a communications link outgoing from the router network node, computing allocations of bandwidth received over communications links incoming to the router network node.

34. The method of claim 1 further comprising:
receiving updated topology information about the network communications environment; receiving updated inter-node communications information; and
computing updated bandwidth allocation information for at least one router network node, the computing based, at least in part, on the received updated topology information and on the received updated inter-node communications information.

35. The method of claim 34 wherein receiving updated topology information, receiving updated inter-node communications information, and computing updated bandwidth allocation information are performed periodically.

36. The method of claim 34 wherein computing updated bandwidth allocation information comprises removing from consideration a network node that does not provide updated information.

37. The method of claim 1 further comprising:
receiving priority information about a data flow of a network node;
and wherein computing bandwidth allocation information comprises giving priority to bandwidth from that network node.

38. The method of claim 1 further comprising:
receiving a bandwidth reservation factor;
and wherein computing bandwidth allocation information comprises allocating only a fraction of available bandwidth, the fraction determined, at least in part, by the bandwidth reservation factor.

39. A computer-readable medium encoded with computer-executable instructions for performing a method for a control unit in a network communications environment to produce routing information, the method comprising:
receiving topology information about the network communications environment;
receiving inter-node communications information;
computing routing information for at least one router network node, the computing based, at least in part, on the received topology information and on the received inter-node communications information, wherein computing routing information comprises applying a max-fair algorithm to the received topology information and to the received inter-node communications information using a multi-commodity flow implementation, wherein applying the max-fair algorithm comprises first satisfying demand in a fair manner and then satisfying remaining demand by maximizing a sum of allocated flow rates;
computing, at the control unit, bandwidth allocation information for at least one router network node, the computing based, at least in part, on the received topology information and on the received inter-node communications information, wherein computing bandwidth allocation information comprises applying the max-fair algorithm to the received topology information and to the received inter-node communications information using the multi-commodity flow implementation; and
sending the bandwidth allocation information to the at least one router network node.

* * * * *